United States Patent
Nemoto

(10) Patent No.: US 8,681,477 B2
(45) Date of Patent: Mar. 25, 2014

(54) SOLID ELECTROLYTIC CAPACITOR AND METHOD FOR MANUFACTURING THE SAME

(75) Inventor: Masaaki Nemoto, Hirakata (JP)

(73) Assignee: SANYO Electric Co., Ltd., Moriguchi (JP)

( * ) Notice: Subject to any disclaimer, the term of this patent is extended or adjusted under 35 U.S.C. 154(b) by 0 days.

(21) Appl. No.: 13/586,935

(22) Filed: Aug. 16, 2012

(65) Prior Publication Data
US 2013/0050904 A1 Feb. 28, 2013

(30) Foreign Application Priority Data

Aug. 30, 2011 (JP) ................................. 2011-187106
Nov. 24, 2011 (JP) ................................. 2011-256082

(51) Int. Cl.
*H01G 9/04* (2006.01)
*H01G 9/145* (2006.01)

(52) U.S. Cl.
USPC ............................ 361/528; 361/523; 361/524

(58) Field of Classification Search
None
See application file for complete search history.

(56) References Cited

U.S. PATENT DOCUMENTS

| | | | |
|---|---|---|---|
| 3,825,802 A * | 7/1974 | Kumagai et al. | 361/529 |
| 7,876,548 B2 * | 1/2011 | Kobayashi et al. | 361/523 |
| 7,990,682 B2 * | 8/2011 | Fujimoto et al. | 361/524 |
| 2008/0123251 A1 * | 5/2008 | Randall et al. | 361/524 |

FOREIGN PATENT DOCUMENTS

JP 02-277213 A 11/1990

* cited by examiner

*Primary Examiner* — Jayprakash N Gandhi
*Assistant Examiner* — Dion Ferguson
(74) *Attorney, Agent, or Firm* — Marvin A. Motsenbocker; Mots Law, PLLC

(57) ABSTRACT

An anode includes a first region adjacent to a root of an anode lead, a second region at a corner of one end surface of the anode, a third region between the first region and the second region, and a fourth region in the interior of the anode into which the anode lead is embedded. The thicknesses of a dielectric layer in the first region and the second region are greater than the thicknesses of the dielectric layer in the third region and the fourth region.

9 Claims, 19 Drawing Sheets

SOLID ELECTROLYTIC CAPACITOR AND METHOD FOR MANUFACTURING THE SAME

BACKGROUND OF THE INVENTION

1. Field of the Invention

This invention relates to solid electrolytic capacitors and methods for manufacturing the same.

2. Description of Related Arts

FIG. 10 shows in cross section the structure of a conventional solid electrolytic capacitor.

As shown in this figure, a conventional solid electrolytic capacitor 120 has a capacitor element composed of: an anode 101 made of a valve metal; an anode lead 102 provided so that one end portion 102a thereof is embedded into the anode 101 and the other end portion 102b extends out of the anode 101; a dielectric layer 13 formed by anodizing the anode 101 and a portion of the anode lead 102; an electrolyte layer 104 formed on the dielectric layer 103; and a cathode extraction layer 105 formed on the electrolyte layer 104. The anode 101 and the anode lead 102 are joined and integrated together by embedding the anode lead 102 into a powder body made of a valve metal to extend at the other end portion 102b out of the powder body, forming the powder body into an anode 101 having the outer shape of a rectangular box, and sintering it.

An anode terminal 107 is attached to the other end portion 102b of the anode lead 102, and a cathode terminal 109 is attached on a portion of the cathode extraction layer 105 by a conductive adhesive 108. The solid electrolytic capacitor 120 is formed by a molding step in which the capacitor element is placed into a mold for resin molding with the anode terminal 107 and the cathode terminal 109 fixed and then encapsulated with a resin outer package 111. In such a solid electrolytic capacitor 120, a region 100a of the anode 101 in the vicinity of an anode surface 101a out of which the anode lead 102 extends is susceptible to stress from the anode lead 102 and the resin outer package 111 upon attachment of the anode terminal 107 and in an assembly step, such as a molding step, so that the dielectric layer 103 formed on the surface of the anode 101 in the region 100a will be likely to cause defects, such as cracks.

To cope with the above problem, a solid electrolytic capacitor described in JP-A H02-277213 proposes a technique in which the dielectric layer formed on the anode 101 has an increased thickness over the entire region 100a described above to prevent the occurrence of cracks due to stress in the dielectric layer formed on the surface of the anode 101 in the above region 100a and thereby reduce the leakage current.

SUMMARY OF THE INVENTION

However, the solid electrolytic capacitor disclosed in JP-A H02-277213 has difficulty in satisfying both the reduction in leakage current and reduction of decrease in capacitance.

Therefore, the present invention has an object of providing a solid electrolytic capacitor capable of reducing the leakage current and reducing decrease in capacitance as compared with conventional solid electrolytic capacitors and a method for manufacturing the solid electrolytic capacitor.

A first solid electrolytic capacitor of the present invention includes an anode, an anode lead, a dielectric layer, and an electrolyte layer. The anode is formed of a porous sintered body. The porous sintered body has a corner at one end surface and a corner at the other end surface. The anode lead has one end portion embedded into the anode and the other end portion extending out of the one end surface of the anode. The dielectric layer is formed on a surface of the anode. The electrolyte layer is formed on the dielectric layer. The anode includes a first region, a second region, a third region, and a fourth region. The first region is a region adjacent to a root of the anode lead. The second region is a region at the corner of the one end surface. The third region is a region between the first region and the second region. The fourth region is a region in the interior of the anode into which the anode lead is embedded. The thicknesses of the dielectric layer in the first region and the second region are greater than the thicknesses of the dielectric layer in the third region and the fourth region.

A first method for manufacturing a solid electrolytic capacitor of the present invention is directed to a method for manufacturing a solid electrolytic capacitor including: an anode formed of a porous sintered body, the porous sintered body having an anode lead extending out of one end surface thereof and having a corner at the one end surface; and a dielectric layer disposed on a surface of the anode. The first method for manufacturing a solid electrolytic capacitor includes an anodization step. In the anodization step, a first region of the anode adjacent to a root of the anode lead and a second region of the anode located at the corner of the one end surface are locally anodized to form the dielectric layer on the surface of the anode.

A second solid electrolytic capacitor of the present invention includes an anode, an anode lead, a dielectric layer, and an electrolyte layer. The anode is formed of a porous sintered body. The porous sintered body has a corner at one end surface and a corner at the other end surface. The anode lead has one end portion embedded into the anode and the other end portion extending out of the one end surface of the anode. The dielectric layer is formed on a surface of the anode. The electrolyte layer is formed on the dielectric layer. The anode includes an eleventh region, a twelfth region, and a thirteenth region. The eleventh region is a region at the corner of the other end surface. The twelfth region is a region in a central portion of a side surface of the anode. The thirteenth region is a region in the interior of the anode into which the anode lead is embedded. The thickness of the dielectric layer in the eleventh region is greater than the thicknesses of the dielectric layer in the twelfth region and the thirteenth region.

A second method for manufacturing a solid electrolytic capacitor of the present invention is directed to a method for manufacturing a solid electrolytic capacitor including: an anode formed of a porous sintered body, the porous sintered body having an anode lead extending out of one end surface thereof and having a corner at the one end surface and a corner at the other end surface located opposite to the one end surface; and a dielectric layer disposed on a surface of the anode. The second method for manufacturing a solid electrolytic capacitor includes an anodization step. In the anodization step, an eleventh region of the anode located at the corner of the other end surface is locally anodized to form the dielectric layer on the surface of the anode.

BRIEF DESCRIPTION OF THE DRAWINGS

FIG. 2A is a perspective view which shows the shape of an anode 1 having an anode lead 2 embedded therein and in which portions (dashed portions) are shown through. FIG. 2B is a perspective view for illustrating regions of the anode 1, in which portions (dashed portions) are shown through.

FIG. 6A is a perspective view for illustrating regions of an anode 1, in which portions (dashed portions) are shown through.

FIG. 8A is a perspective view for illustrating regions of an anode 1, in which portions (dashed portions) are shown through.

FIG. 11A is a perspective view which shows the shape of an anode 1 having an anode lead 2 embedded therein and in which portions (dashed portions) are shown through. FIG. 11B is a perspective view for illustrating regions of the anode 1, in which portions (dashed portions) are shown through.

FIG. 17A is a perspective view for illustrating regions of an anode 1, in which portions (dashed portions) are shown through.

DETAILED DESCRIPTION OF PREFERRED EMBODIMENTS

Figure 1:
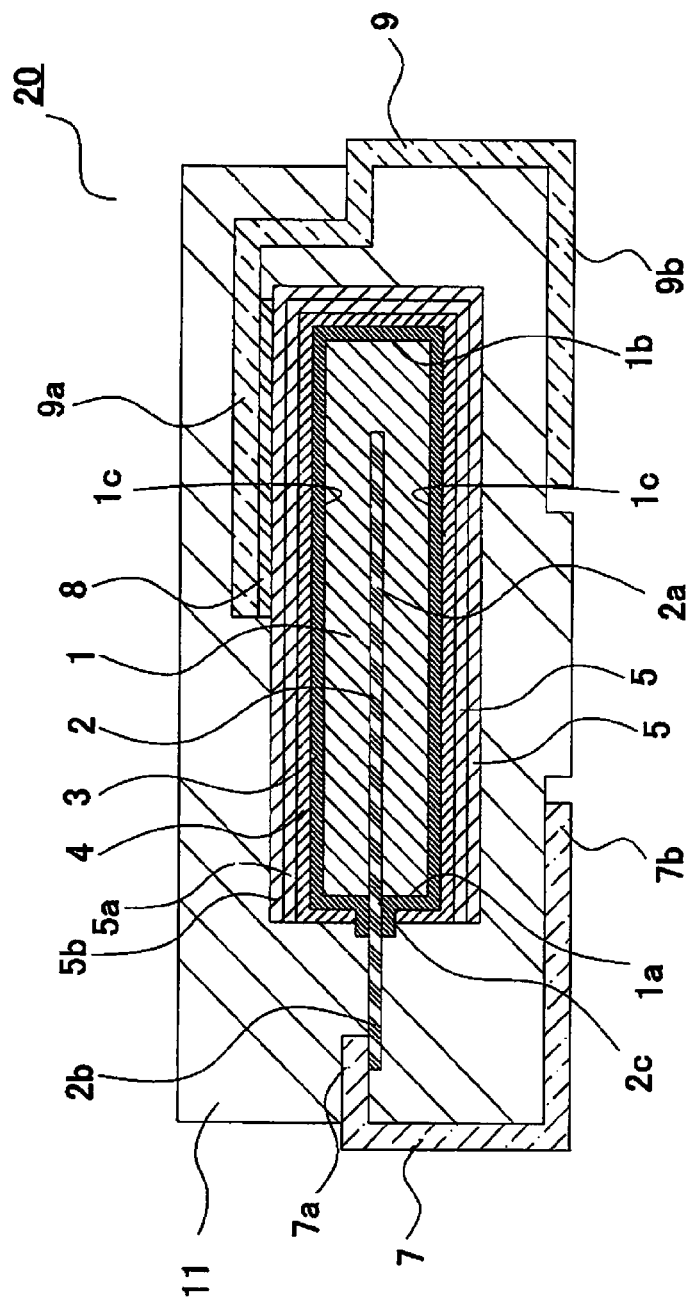
FIG. 1 is a cross-sectional view for illustrating a solid electrolytic capacitor of a first embodiment.

Next, a description will be given of embodiments of the present invention with reference to the drawings. Throughout the drawings described below, the same or like reference numerals refer to the same or like parts. However, it should be noted that each drawing is a schematic view and may represent different dimensional ratios and the like from those of the actual solid electrolytic capacitor. Therefore, specific dimensions and the like should be determined in consideration of the following descriptions. Furthermore, it is a matter of course that different drawings include elements which have different dimensional relations and ratios.

(First Embodiment)

FIG. 1 is a cross-sectional view for illustrating the interior of a solid electrolytic capacitor 20 of this embodiment.

The solid electrolytic capacitor 20 of this embodiment has, as shown in FIG. 1, a capacitor element including: an anode 1 in which an anode lead 2 is embedded; a dielectric layer 3 formed on the anode 1; an electrolyte layer 4 formed on the dielectric layer 3; and a cathode extraction layer 5 formed on the electrolyte layer 4. An anode terminal 7 is connected to the other end portion 2b of the anode lead 2, and a cathode terminal 9 is bonded to the cathode extraction layer 5 by a conductive adhesive 8. Furthermore, a resin outer package 11 is formed to surround the capacitor element and expose respective portions of the anode terminal 7 and the cathode terminal 9 to the outside. Note that this figure schematically shows only a portion of the dielectric layer 3 formed on the outside surface of the anode 1 formed of a porous sintered body. Regions of the anode 1 and the thickness distribution of the dielectric layer 3 in this embodiment will be described later.

Hereinafter, a description will be given of a specific structure of the solid electrolytic capacitor 20 of this embodiment.

In this embodiment, the material used for the anode 1 is a porous sintered body made of a valve metal or a valve metal-based alloy. The anode 1 is produced by forming metal particles made of one of a large number of kinds of valve metals or one of a large number of kinds of valve metal-based alloys into a green anode body and sintering the green anode body. Examples of the valve metal include tantalum, niobium, aluminum, and titanium. Preferred examples of the valve metal-based alloy are those in which the weight of additive in the alloy is 10% or less of the total weight of the alloy. Examples of the additive contained in the valve metal-based alloy include silicon, vanadium, boron, and nitrogen. The alloy is formed by adding such an additive to the valve metal serving as a main component.

Like the anode 1, a valve metal or a valve metal-based alloy can be used as a material for the anode lead 2. Alternatively, any valve metal different from the material for the anode 1 may be used as a material for the anode lead 2.

As shown in FIG. 1, the anode 1 has one end surface 1a, the other end surface 1b, and side surfaces 1c, all of which form the outside surface of the porous sintered body. The anode 1 is provided with an anode lead 2 so that one end portion 2a thereof is embedded into the anode 1 and the other end portion 2b thereof extends out of the one end surface 1a of the anode 1. The other end surface 1b is a surface of the anode 1 opposed to the one end surface 1a. A root 2c of the anode lead 2 refers to a portion of the anode lead 2 beyond which the anode lead 2 extends out of the anode 1.

Figure 2A:
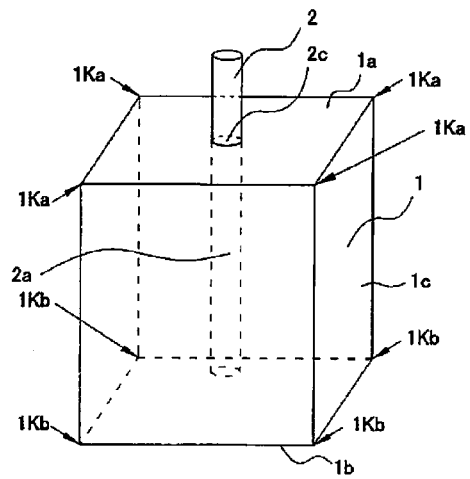

FIG. 2A is a perspective view which shows the shape of the anode 1 having the anode lead 2 embedded therein and in which portions (dashed portions) are shown through. As shown in FIG. 2A, the anode 1 has the outer shape of a rectangular box composed of one end surface 1a, the other end surface 1b, and four side surfaces 1c located between the one end surface 1a and the other end surface 1b. Furthermore, the anode 1 has eight corners 1Ka, 1Kb, which are apexes of the rectangular box. The corners 1Ka are those of the one end surface 1a, while the corners 1Kb are those of the other end surface 1b.

Figure 2B:
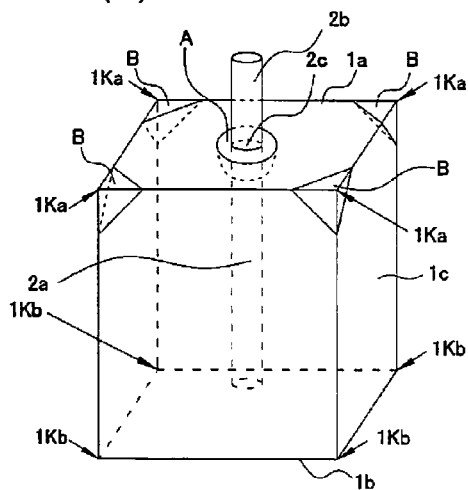
Figure 2C:
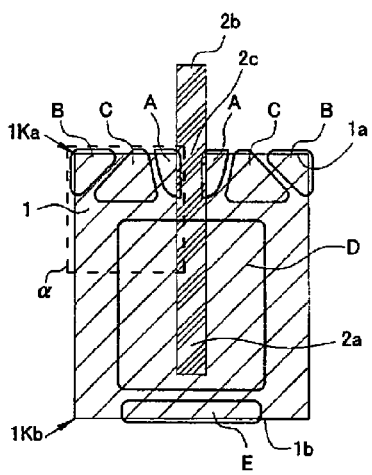
FIG. 2C is a cross-sectional view in which the anode 1 is cut diagonally across corners 1Ka, 1Kb and the anode lead 2.

FIG. 2B is a perspective view for illustrating regions of the anode 1, in which portions (dashed portions) are shown through. FIG. 2C is a cross-sectional view in which the anode 1 is cut diagonally across the corners 1Ka, 1Kb and the anode lead 2. The anode 1 includes a first region A, second regions B, a third region C, a fourth region D, and fifth regions E. FIG. 2B shows only the first region A and the second regions B. In FIG. 2C, the regions enclosed by the dash-single-dot lines A, B, C, D, and E show the first region A, the second region B, the third region C, the fourth region D, and the fifth region E, respectively. The first region A is a region adjacent to the root 2c at which the anode lead 2 is embedded into the anode 1. The second regions B are regions at the corners 1Ka of the one end surface 1a. The third region C is a region at the one end surface 1a between the first region A and the second regions B. The fourth region D is a region located in the interior of the anode 1 and surrounding one end portion 2a of the anode lead 2 embedded in the anode 1. The fifth regions E are regions located in a portion of the other end surface 1b other than the corners 1Kb and in central portions of the side surfaces 1c.

Figure 3:
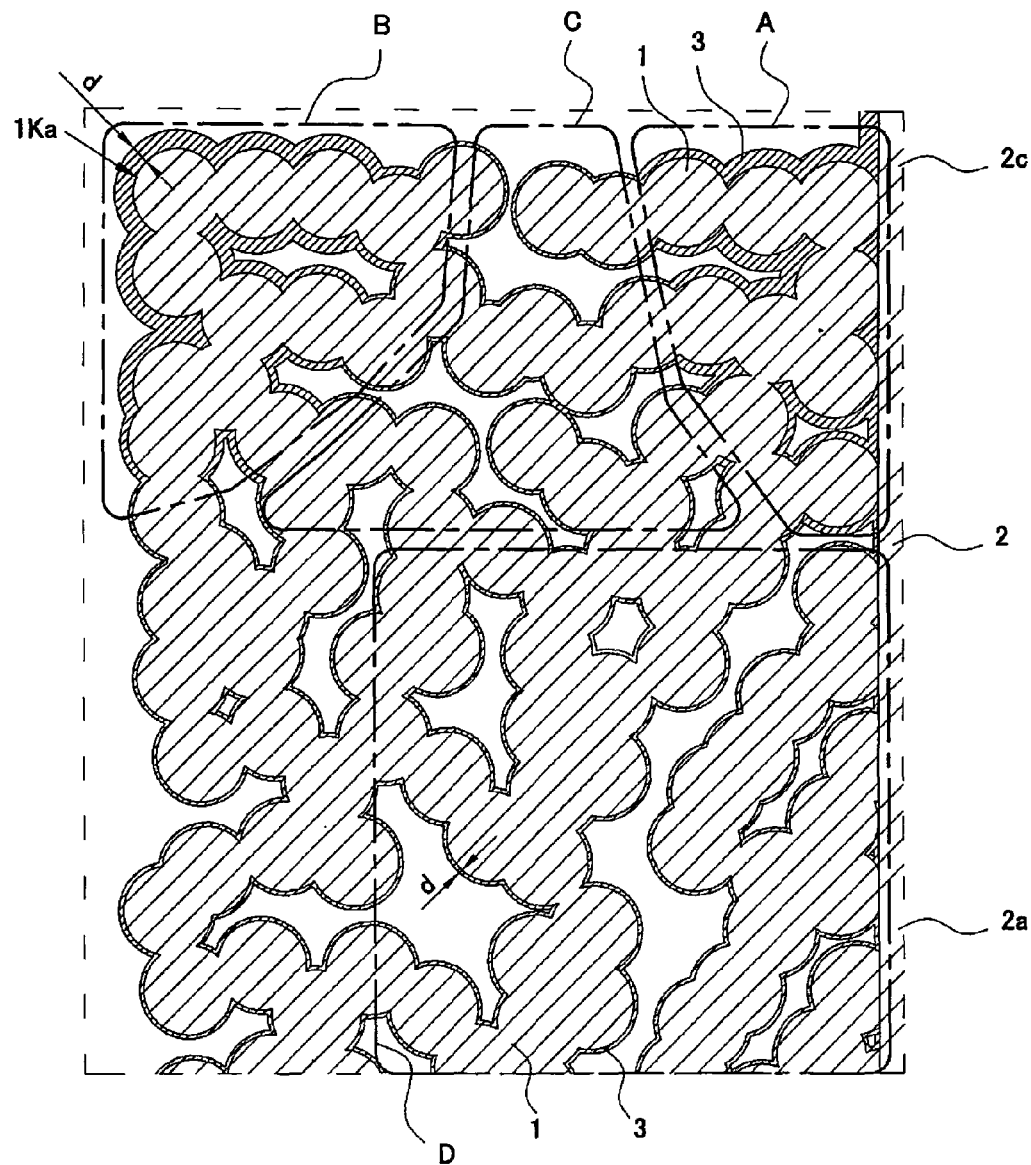
FIG. 3 is a cross-sectional view showing a relevant part of the anode 1 in the first embodiment.

FIG. 3 is a schematic cross-sectional view showing the dielectric layer 3 formed on the surface of the anode 1 within an area of the anode 1 enclosed by the dash line a in FIG. 2C. Since, as shown in FIG. 3, the dielectric layer 3 is formed on the surface of the anode 1 made of a porous sintered body, it is formed not only on the outside surface of the porous sintered body but also the wall surfaces of pores inside the porous sintered body. As shown in this figure, the thicknesses of the dielectric layer 3 on the surface of the anode 1 in the first region A and the second region B are greater than the thicknesses of the dielectric layer 3 on the surface of the anode 1 in the third region C and the fourth region D. Furthermore, the thicknesses of the dielectric layer 3 on the surface of the anode 1 in the first region A and the second region B are greater than the thickness of the dielectric layer 3 on the surface of the anode 1 in the fifth regions E.

In this embodiment, the first region A is formed concentrically with the periphery of the root 2c of the anode lead 2. However, the first region A may not necessarily be fully concentric with the root 2c and the concentric ring may lack a portion.

In this embodiment, as shown in FIG. 3, the dielectric layer 3 is formed in the first region A to gradually reduce its thickness with distance from the root 2c of the anode lead 2. Furthermore, as shown in this figure, the dielectric layer 3 is formed in the second region B to gradually reduce its thickness with distance from the corner 1Ka of the anode 1. However, the portions of the dielectric layer 3 in the first region A and the second region B may be formed uniformly and thick.

The thickness of the dielectric layer 3 can be measured with a cross-sectional scanning electron microscope (cross-sectional SEM). As shown in FIG. 3, the thickness of the dielectric layer 3 can be determined by measuring the distance d from the surface of the anode 1 to the surface of the dielectric layer 3. The use of a cross-sectional SEM image in this manner enables the measurement of the thickness of the dielectric layer 3 on the outside surface of the porous sintered body and the thickness of the dielectric layer 3 on the wall surfaces of pores inside the porous sintered body. In this embodiment, the thicknesses of the dielectric layer 3 at arbitrary five points in each of the first to fourth regions, for example, within the cross section shown in FIG. 2C, are measured and the measured values for each region are averaged to determine the thickness of the dielectric layer 3 in each of the first to fourth regions. The thickness of the dielectric layer 3 in the fifth region E is also determined in the same manner.

The electrolyte layer 4 is formed on the surface of the dielectric layer 3. Although in this embodiment the electrolyte layer 4 is formed to fill in the pores in the porous sintered body, the interior of the pores may be partly devoid of the electrolyte layer 4. Examples of the material that can be used for the electrolyte layer 4 include conductive polymers and manganese dioxide. The conductive polymers can be formed such as by chemical polymerization or electropolymerization and examples of materials thereof include polypyrrole, polythiophene, polyaniline, and polyfuran. The electrolyte layer 4 may be formed of a single layer or formed of a plurality of layers.

The cathode extraction layer 5 is formed to cover the electrolyte layer 4, and has a layered structure in which a carbon layer 5a and a silver paste layer 5b are formed in this order on the electrolyte layer 4. The carbon layer 5a is formed of a layer containing carbon particles. Thus, the cathode extraction layer 5 is formed on and in direct contact with the electrolyte layer 4. In this embodiment, the cathode extraction layer 5 is not formed on the one end surface 1a of the anode 1 in order to prevent short-circuiting with the anode lead 2.

The cathode terminal 9 is attached to the cathode extraction layer 5. Specifically, the cathode terminal 9 is formed by bending a metal strip. As shown in FIG. 1, the underside of one end portion 9a of the cathode terminal 9 is bonded to the cathode extraction layer 5 by a conductive adhesive 8, whereby the cathode terminal 9 and the cathode extraction layer 5 are mechanically and electrically connected to each other. A specific example of the material for the conductive adhesive 8 is a silver paste made by mixing silver and epoxy resin.

The cathode extraction layer 5 may be composed of either one of the carbon layer 5a and the silver paste layer 5b, and can have various structures so long as it can electrically connect the electrolyte layer 4 to the cathode terminal 9.

The anode terminal 7 is attached to the other end portion 2b of the anode lead 2. Specifically, the anode terminal 7 is formed by bending a metal strip. As shown in FIG. 1, the underside of one end portion 7a of the anode terminal 7 is mechanically and electrically connected to the other end portion 2b of the anode lead 2 by welding or otherwise.

Examples of materials for the anode terminal 7 and the cathode terminal 9 include copper, copper alloys, and iron-nickel alloy (42 alloy).

The resin outer package 11 is formed to cover exposed surrounding surfaces of the anode lead 2, the electrolyte layer 4, the cathode extraction layer 5, the anode terminal 7, and the cathode terminal 9 which are arranged as above. The other end portion 7b of the anode terminal 7 and the other end portion 9b of the cathode terminal 9 are exposed to the outside to extend from the side surfaces to the bottom surface of the resin outer package 11. The exposed portions of the terminals 7 and 9 can be used for soldering to a substrate. Examples of materials that can be used for the resin outer package 11 include materials functioning as sealants, and specific examples thereof include epoxy resin and silicone resin. The resin outer package 11 can be formed by curing a resin prepared by appropriately mixing a base resin, a hardener, and a filler.

(Functions and Effects)

In the solid electrolytic capacitor of this embodiment, since the thicknesses of the dielectric layer 3 in the first region A likely to receive stress from the anode lead 2 and the second regions B likely to receive stress from the resin outer package 11 and others are greater than that of the dielectric layer 3 in the fourth region D inside the anode 1, the effects of the stress in the first and second regions A and B can be reduced to reduce the leakage current. Furthermore, out of the regions of the one end surface 1a of the anode 1 at which the anode lead 1 extends out, the third region C less likely to receive the above stress is coated with a thinner dielectric layer than the first and second regions A and B, which reduces the decrease in capacitance due to increased thickness of the dielectric layer 3.

Moreover, in this embodiment, the thickness of the dielectric layer 3 in the fifth regions E is smaller than those of the dielectric layer 3 in the first and second regions A and B. Therefore, the thickness of the dielectric layer 3 in the fifth regions E less likely to receive stress from the resin outer package 11 is smaller than those of the dielectric layer 3 in the first and second regions A and B, so that the decrease in capacitance can be further reduced.

In this embodiment, only the thicknesses of the dielectric layer 3 in the first and second regions A and B are greater than those of the dielectric layer 3 in the regions other than the first and second regions A and B. Therefore, only the thicknesses of the dielectric layer 3 in the first and second regions A and B susceptible to stress from the resin outer package 11 and the anode lead 2 are greater than those of the dielectric layer 3 in the other regions, so that the decrease in capacitance can be further reduced.

In this embodiment, the electrolyte layer 4 is exposed, at its portion facing the one end surface 1a of the anode 1, from the cathode extraction layer 5. The dielectric layer 3 is susceptible to stress near such a portion of the electrolyte layer 4 that the cathode extraction layer 5 is not formed, and more susceptible to stress particularly in the first and second regions A and B. To cope with this, in this embodiment, the thicknesses of the dielectric layer 3 in the first and second regions A and B, which are near the portion of the electrolyte layer 4 where the cathode extraction layer 5 is not formed, are locally increased, so that the leakage current can be further reduced and the decrease in capacitance can be further reduced.

In this embodiment, since the dielectric layer 3 is formed in the first region A to gradually reduce its thickness with distance from the root 2c of the anode lead 2, the continuous thickness change of the dielectric layer 3 in the region enables stress applied to the dielectric layer 3 to be dispersed, resulting in further reduced leakage current.

Furthermore, in this embodiment, since the dielectric layer 3 is formed in the second regions B to gradually reduce its thickness with distance from the corners (apexes) 1Ka of the one end surface 1a, the continuous thickness change of the dielectric layer 3 in these regions enables stress applied to the dielectric layer 3 to be dispersed, resulting in further reduced leakage current.

Although in this embodiment the thickness of the dielectric layer 3 is increased at all of the four corners 1Ka of the one end surface 1a, the leakage current can be reduced simply by increasing the thickness of the dielectric layer 3 at least at one corner 1Ka and in this case the decrease in capacitance can be further reduced.

Although in this embodiment the anode 1 used has the outer shape of a rectangular box, the shape of the anode 1 is not limited to the rectangular box and the anode 1 need only have such a shape that the one end surface 1a has a corner. Also in such a case, the dielectric layer needs to be formed locally thick in a region of the anode 1 adjacent to the root 2c of the anode lead 2 and a region thereof located at the corner of the one end surface 1a.

(Manufacturing Method of Tantalum Solid Electrolytic Capacitor of First Embodiment)

A description will be given below of an example of a method for manufacturing a tantalum solid electrolytic capacitor of this embodiment.

<Step 1: Formation of Anode>

A plurality of tantalum metal particles having a primary particle diameter of approximately 0.5 μm and a secondary particle diameter of approximately 100 μm are used as a material for an anode 1. The tantalum metal particles are formed into a green anode body with one end portion 2a of an anode lead 2 embedded thereinto, and the green anode body is sintered in vacuum to integrate and join an anode 1 made of a porous sintered body and the anode lead 2 together. Thus, the other end portion 2b of the anode lead 2 is fixed in a manner extending out of one end surface 1a of the anode 1. The anode 1 made of a porous sintered body thus formed has the outer shape of a rectangular box, for example, with a length of 4.2 mm, a width of 3.4 mm, and a thickness of 0.9 mm. Although in this embodiment tantalum is used as the material for the anode, various valve metals, such as niobium and titanium, and various valve metal-based alloys can be used for the anode.

<Step 2: First Anodization Step>

Figure 4:
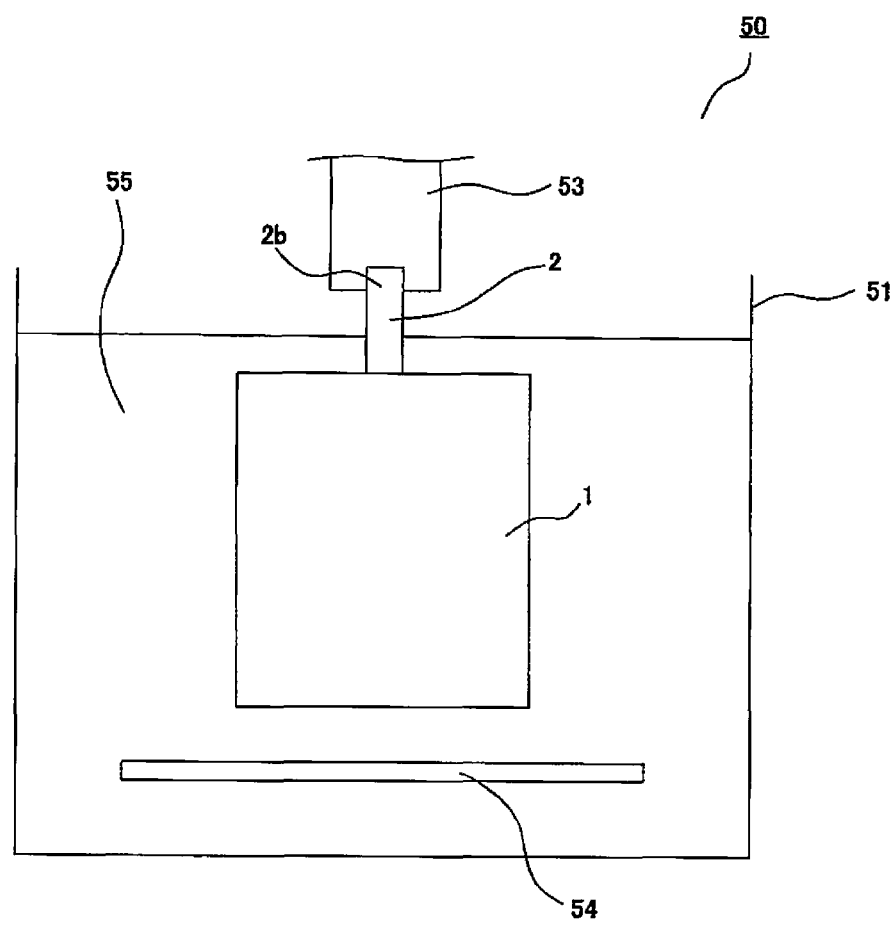
FIG. 4 is a view for illustrating a first anodization step in the first embodiment.

FIG. 4 is a view for illustrating a first anodization step. The anode 1 is anodized to form a dielectric layer 3 made of an oxide film on the surface of the anode 1. A conversion coating apparatus 50 includes a treatment cell 51, an anode 53, a cathode 54, and an electrolytic aqueous solution 55. The anode 53 and the cathode 54 are connected through their respective wires (not shown) to a power source. The cathode 54 is disposed in the treatment cell 51 close to the bottom and has a plate-like shape. The other end portion 2b of the anode lead 2 is connected to the anode 53, the anode 1 and a portion of the anode lead 2 are immersed into the electrolytic aqueous solution 55, which is 0.01% to 0.1% by weight phosphoric acid aqueous solution, put in the treatment cell 51, and they are anodized under conditions of an electric current of 1 to 10 mA and an anodization voltage of 5 to 100 V for 3 to 20 hours. Thus, a dielectric layer 3 of tantalum oxide ($Ta_2O_5$) can be formed on the surface of the anode 1 and the portion of the anode lead 2. Through this first anodization step, a dielectric layer 3 having a uniform thickness is formed on the surface of the anode 1 made of a porous sintered body, i.e., on the outside surface of the anode 1 and the wall surfaces of pores inside the anode 1.

The electrolytic aqueous solution 55 that can be used is not limited to the phosphoric acid aqueous solution and other examples thereof include nitric acid, acetic acid, and sulfuric acid.

<Step 3: Second Anodization Step (Local Conversion Treatment)>

A description will be given below of a second anodization step for locally subjecting to conversion treatment a first region A adjacent to the root 2c of the anode lead 2 and second regions B located at the corners 1Ka of the anode 1, all of which have a uniform dielectric layer 3.

Figure 5A:
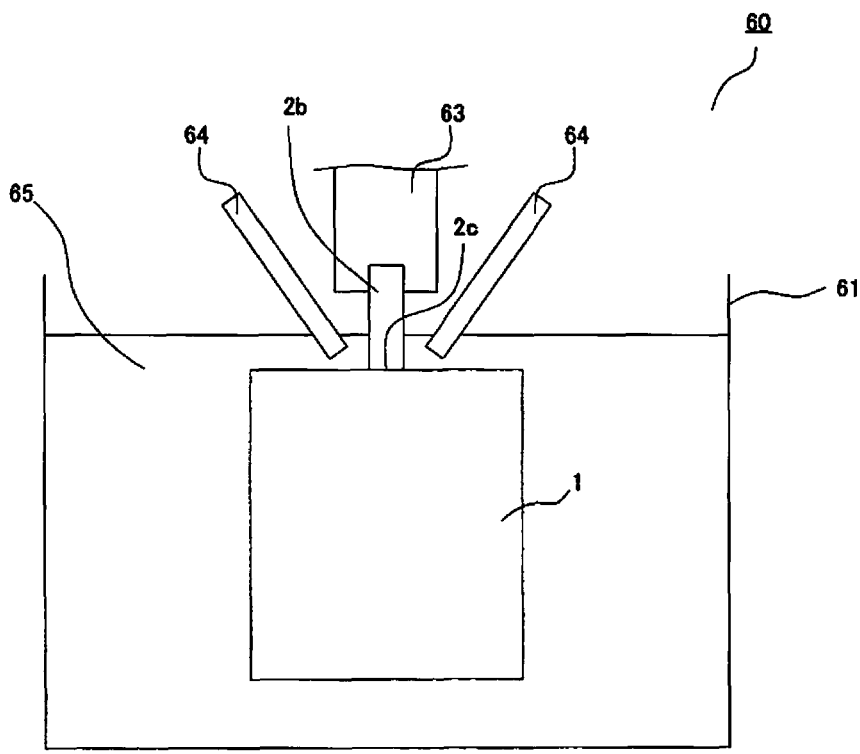
FIG. 5A is a schematic view of a conversion coating apparatus 60.
Figure 5B:
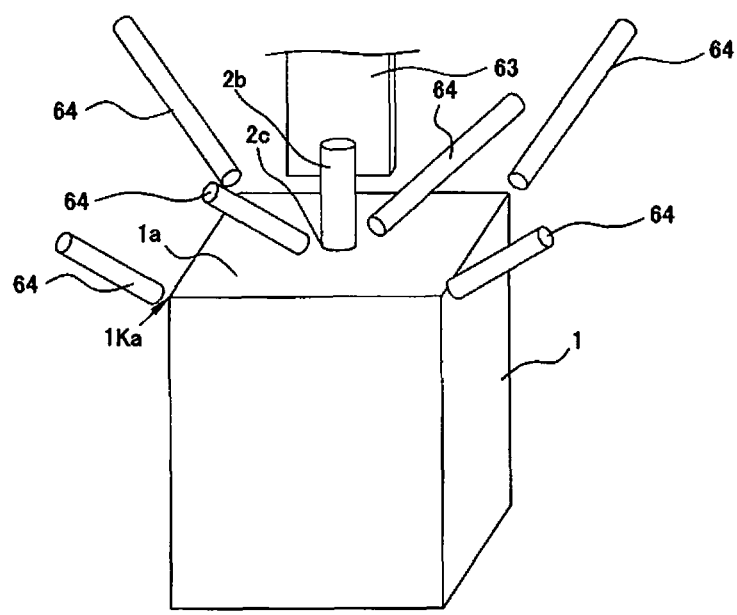
FIG. 5B is a schematic perspective view showing an arrangement of an anode 63 and cathodes 64 relative to the anode 1 and the anode lead 2.

FIG. 5 is views for illustrating the second anodization step. As shown in FIG. 5A, a conversion coating apparatus 60 includes a treatment cell 61, an anode 63, cathodes 64 (some not shown in this figure), and an electrolytic aqueous solution 65. FIG. 5B is a schematic perspective view showing an arrangement of the anode 63 and the cathodes 64 relative to the anode 1 and the anode lead 2. The anode 63 is connected to the other end portion 2b of the anode lead 2. The cathodes 64 have the shape of a thin wire, two of which are opposed to each other in the vicinity of the root 2c of the anode lead 2 and the remaining four of which are arranged close to the respective corners 1Ka of the one end surface 1a of the anode 1. This arrangement of the cathodes 64 enables the cathodes 64 to be kept away from the region of the anode 1 located between the root 2c of the anode lead 2 and the corners 1Ka of the anode 1. The anode and the cathodes 64 are connected through their respective wires (not shown) to a power source.

The local conversion treatment involves collecting the current to desired points. Therefore, it is necessary to control the concentration (electrical conductivity) of the electrolytic aqueous solution and appropriately arrange the cathodes 64. Specifically, although in the first anodization step a phosphoric acid aqueous solution (electrolytic aqueous solution 55) having a concentration of 0.01% to 0.1% by weight is used, a phosphoric acid aqueous solution (electrolytic aqueous solution 65) having a lower concentration than that in the first anodization step is used in the second anodization step for performing local conversion treatment. Since anodization is performed in this manner so that the concentration of the electrolytic aqueous solution 65 is low and the cathodes 64 are arranged at predetermined points near the anode 1, the thicknesses of the dielectric layer on the surface of the anode 1 in the first and second regions A and B can be locally increased as compared with the thicknesses of the dielectric layer on the surface of the anode 1 in the other regions, i.e., the third to fifth regions C to E.

The first and second regions A and B are appropriately formed depending upon the shape of the anode 1. For example, the portion of the dielectric layer 3 in the first region A is preferably formed to have an increased thickness over the range of 0.01 to 1 mm from the root 2c of the anode lead 2. The portions of the dielectric layer 3 in the second regions B are preferably formed to have an increased thickness over the range of 0.01 to 0.5 mm from the respective corners 1Ka of the anode 1.

Even if the cathodes 64 are locally arranged, the thickness distribution of the dielectric layer 3 is broadened when the concentration of the electrolytic aqueous solution 65 is high. Therefore, the phosphoric acid aqueous solution preferably has a concentration of about 0.0001% to about 0.005% by weight.

If the distance from the tip of the cathode 64 having the shape of a thin wire to the surface of the anode 1 is too large, the thickness distribution of the dielectric layer 3 may be broadened. On the other hand, if the distance is too small, the dielectric layer 3 may form a short-circuit with the anode 1. Therefore, the distance from the tip of the cathode 64 to the surface of the anode 1 is preferably about 0.1 to about 3 mm.

If the time of local conversion treatment is too short, the dielectric layer 3 cannot have a sufficient thickness. On the other hand, if the time of local conversion treatment is too long, the thickness distribution of the dielectric layer 3 will be broadened. Therefore, the local conversion treatment is preferably performed for a period of from 0.5 to 10 minutes. If the voltage for local conversion treatment is too low, the dielectric layer 3 cannot have a sufficient thickness. On the other hand, if the voltage is too high, the thickness distribution of the dielectric layer will be broadened. Therefore, the local conversion treatment is preferably performed at a voltage of from 50 to 300V. In addition, the voltage for local conversion treatment is preferably twice to ten times the anodization voltage in the first anodization step.

The electrolytic aqueous solution 65 that can be used for local conversion treatment is not limited to the phosphoric acid aqueous solution and other examples thereof include nitric acid, acetic acid, and sulfuric acid. In this embodiment, since the electrolytic aqueous solutions containing the same electrolyte are used in both the first and second anodization steps, the washing step after the first anodization step can be simplified.

Although the cathodes 64 shown in FIG. 5B have the shape of a thin wire, a needle-like electrode having a pointed tip end may be used instead. As the tip of the cathode 64 is sharpened, a better localized thickness distribution of the dielectric layer 3 can be achieved.

<Step 4: Formation of Electrolyte Layer>

An electrolyte layer 4 is formed on the surface of the dielectric layer 3. The method for forming the electrolyte layer 4 using a conductive polymer for the electrolyte layer 4 is as follows: First, a precoat layer made of a conductive polymer, such as polypyrrole, is formed by chemical polymerization. Subsequently, a conductive polymer layer made of polypyrrole, for example, is formed on the surface of the precoat layer by electropolymerization. In this manner, a conductive polymer electrolyte layer 4 composed of a film stack of the precoat layer and the conductive polymer layer can be formed on the dielectric layer 3. The electrolyte layer 4 is also formed on the dielectric layer 3 formed on the wall surfaces of pores in the anode 1.

<Step 5: Formation of Cathode Extraction Layer>

A carbon layer 5a is formed by applying a carbon paste to and in direct contact with the surface of the electrolyte layer 4, and a silver paste layer 5b is then formed by applying a silver paste to the carbon layer 5a. In this embodiment, the cathode extraction layer 5 is composed of the carbon layer 5a and the silver paste layer 5b. Furthermore, in this embodiment, the cathode extraction layer 5 is formed so that the electrolyte layer is exposed at its portion facing the one end surface 1a of the anode 1.

<Step 6: Connection of Anode Terminal and Cathode Terminal>

One end portion 7a of an anode terminal 7 is electrically and mechanically connected to the other end portion 2b of the anode lead 2 by welding or otherwise. Furthermore, one end portion 9a of a cathode terminal 9 is electrically and mechanically connected to a surface of the cathode extraction layer 5 by a conductive adhesive 8.

<Step 7: Molding Process>

The product obtained after the completion of Steps 1 to 6 is encapsulated by transfer molding with a sealant containing epoxy resin and an imidazole compound to allow the anode and cathode terminals to be partly exposed to the outside, thereby forming a resin outer package 11. Specifically, the sealant is previously heated, poured into a mold, and cured in the mold. After the formation of the resin outer package 11, the exposed portions of the anode and cathode terminals are bent from the lateral sides of the resin outer package 11 to the bottom surface thereof, thereby forming terminal ends 7b and 9b to be used for soldering to a substrate.

In the manufacturing method of this embodiment, since the portions of the dielectric layer in the first and second regions A and B susceptible to stress in connecting the anode terminal and molding step can be formed locally thicker than the portions of the dielectric layer in the other regions, the leakage current can be reduced and the decrease in capacitance can be further reduced.

(Second Embodiment)

Next, a description will be given of a solid electrolytic capacitor of a second embodiment. Further explanation of the same elements as in the first embodiment described above will be omitted.

In this embodiment, not only in the first and second regions A and B in the first embodiment but also in a sixth region to be described later, the dielectric layer 3 is increased in thickness.

Figure 6A:
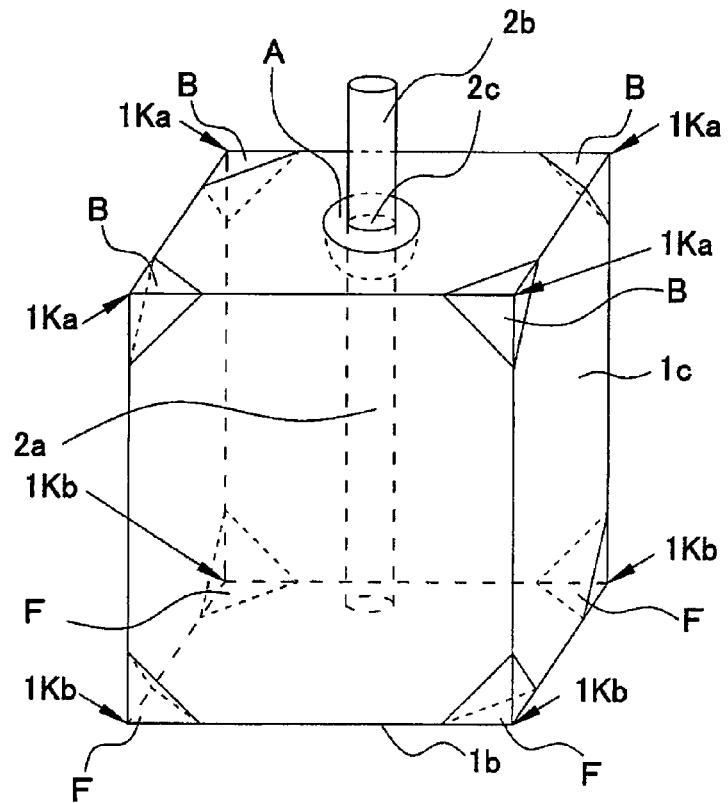
Figure 6B:
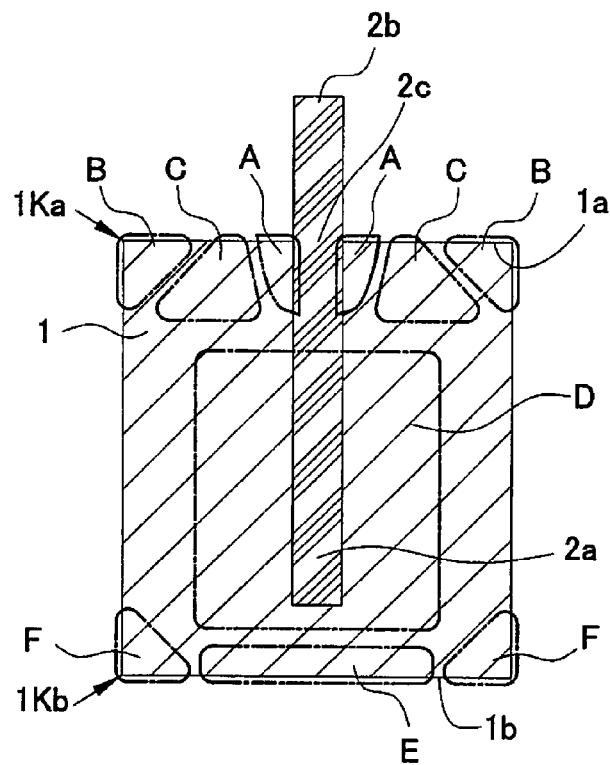
FIG. 6B is a cross-sectional view in which the anode 1 is cut diagonally across corners 1Ka, 1Kb and an anode lead 2.

FIG. 6A is a perspective view for illustrating regions of the anode 1, in which portions (dashed portions) are shown through. FIG. 6B is a cross-sectional view in which the anode 1 is cut diagonally across corners 1Ka, 1Kb and the anode lead 2. The first region A, the second regions B, the third region C, the fourth region D, and the fifth regions E shown in FIGS. 6A and 6B are the same as in the first embodiment. The sixth regions F shown in FIGS. 6A and 6B are regions at the corners 1Kb of the other end surface 1b which is a surface of the anode 1 opposite to the one end surface 1a of the anode 1.

In the solid electrolytic capacitor of this embodiment, the thicknesses of the dielectric layer 3 in the first region A, the second regions B, and the six regions F are greater than those of the dielectric layer 3 in the third region C and the fourth region D.

In this embodiment, since the thicknesses of the dielectric layer in the second regions B and six regions F located at the corners 1Ka and 1Kb of the anode 1, which are regions susceptible to stress from the resin outer package 11, are greater than those of the dielectric layer 3 in the third region C and fourth region D, the leakage current of the solid electrolytic capacitor can be further reduced.

Note that in this embodiment the thicknesses of the dielectric layer 3 in the first region A, the second regions B, and the six regions F are greater than those of the dielectric layer 3 in the regions other than the first region A, the second regions B, and the sixth region F.

(Manufacturing Method of Tantalum Solid Electrolytic Capacitor of Second Embodiment)

A description will be given below of a method for manufacturing a tantalum solid electrolytic capacitor of this embodiment.

The following description will be given of Step 3 different from that in the first embodiment. Further explanation of the same elements as in the first embodiment described above will be omitted.

<Step 3: Second Anodization Step (Local Conversion Treatment)>

Figure 7:
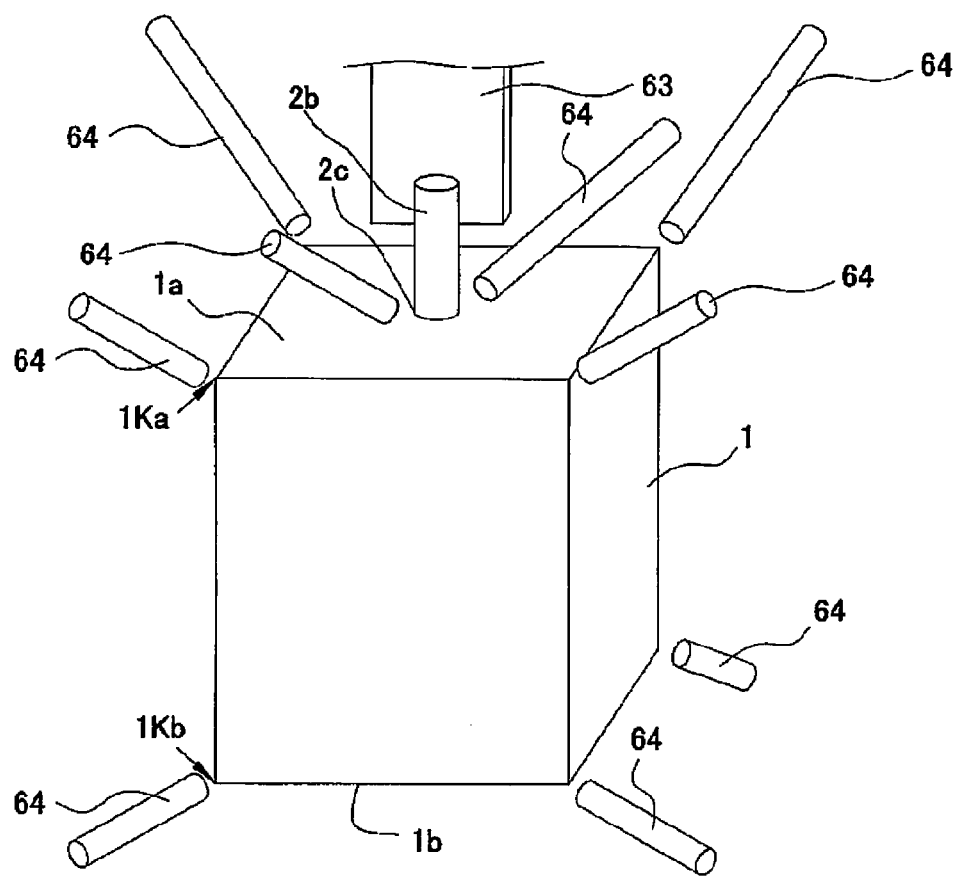
FIG. 7 is a view for illustrating a second anodization step in a second embodiment.

FIG. 7 is a schematic perspective view showing an arrangement of an anode 63 and cathodes 64 in a conversion coating apparatus. The anode 63 is connected to the other end portion 2b of the anode lead 2. The cathodes 64 are arranged not only close to the region of the anode 1 adjacent to the root 2c of the anode lead and the regions thereof located at the corners 1Ka of the one end surface 1a but also close to the regions thereof located at the four corners 1Kb of the other end surface 1b opposite to the one end surface 1a, one cathode for each of the four corners 1Kb.

Since the cathodes 64 are arranged as shown in this figure and local conversion treatment is performed, the thicknesses of the dielectric layer 3 in the sixth regions F, which are the regions at the corners 1Kb of the other end surface 1b of the anode 1, can be locally increased like those in the first region A and the second regions B.

(Third Embodiment)

Next, a description will be given of a solid electrolytic capacitor of a third embodiment. Further explanation of the same elements as in the first and second embodiments described above will be omitted.

Figure 8A:
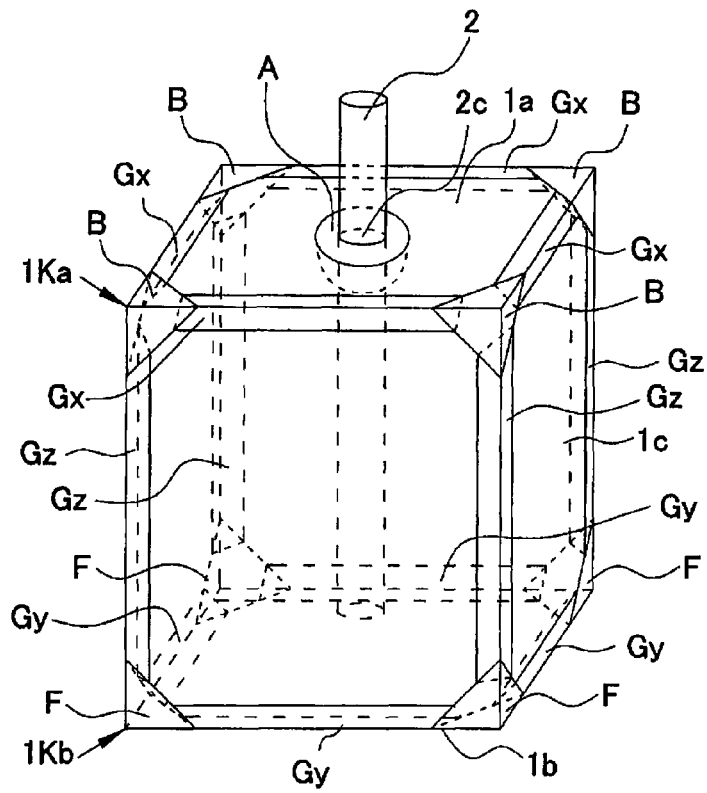
Figure 8B:
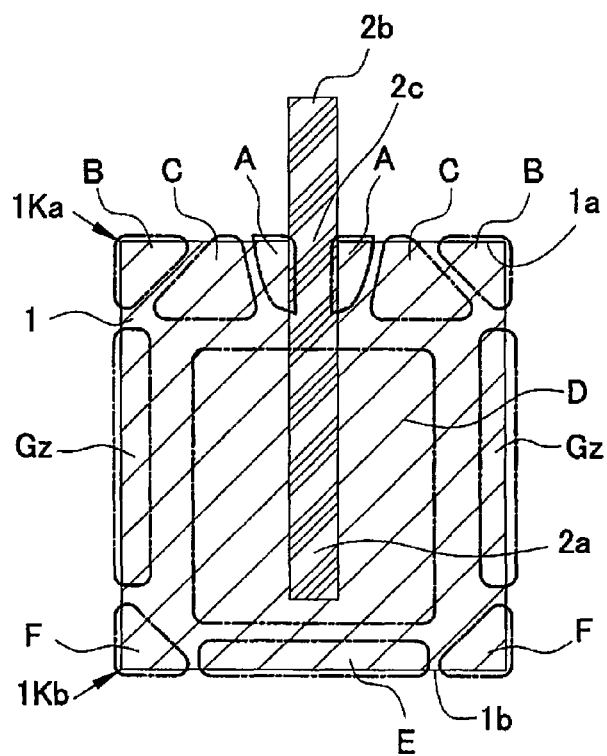
FIG. 8B is a cross-sectional view in which the anode 1 is cut diagonally across corners 1Ka, 1Kb and an anode lead 2.

FIG. 8A is a perspective view for illustrating regions of the anode 1, in which portions (dashed portions) are shown through. FIG. 8B is a cross-sectional view in which the anode 1 is cut diagonally across corners 1Ka, 1Kb and the anode lead 2. In this embodiment, not only in the first region A, the second regions B, and the sixth regions F but also in seventh regions Gx, Gy, and Gz which are the ridges of the anode formed of a rectangular box as shown in FIGS. 8A and 8B, the dielectric layer 3 is increased in thickness. The seventh regions Gx are four ridges connecting between the adjacent corners 1Ka of the anode 1. The seventh regions Gy are four ridges connecting between the adjacent corners 1Kb of the anode 1. The seventh regions Gz are four ridges connecting between the adjacent corners 1Ka and 1Kb of the anode 1.

Since in the solid electrolytic capacitor of this embodiment the thickness of the dielectric layer is increased in the seventh regions Gx, Gy, and Gz, which are the regions around the edges of the anode 1 second most susceptible to stress from the resin outer package 11 after the first and second regions A and B, the leakage current of the solid electrolytic capacitor can be further reduced.

(Manufacturing Method of Tantalum Solid Electrolytic Capacitor of Third Embodiment)

A description will be given below of a method for manufacturing a tantalum solid electrolytic capacitor of this embodiment.

The following description will be given of Step 3 different from that in the first embodiment. Further explanation of the same elements as in the first embodiment described above will be omitted.

<Step 3: Second Anodization Step (Local Conversion Treatment)>

Figure 9:
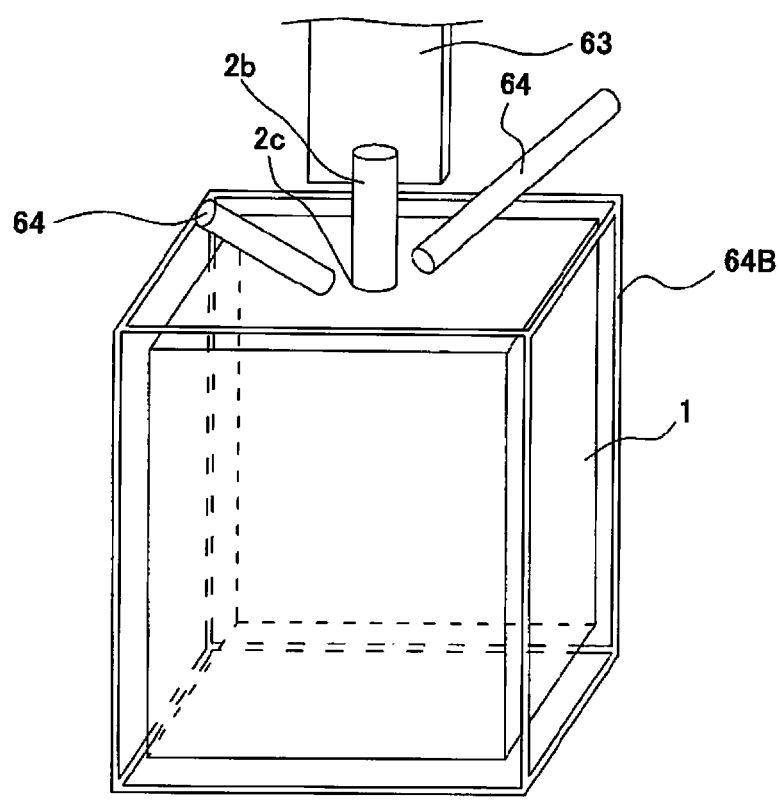
FIG. 9 is a view for illustrating a second anodization step in a third embodiment.
Figure 10:
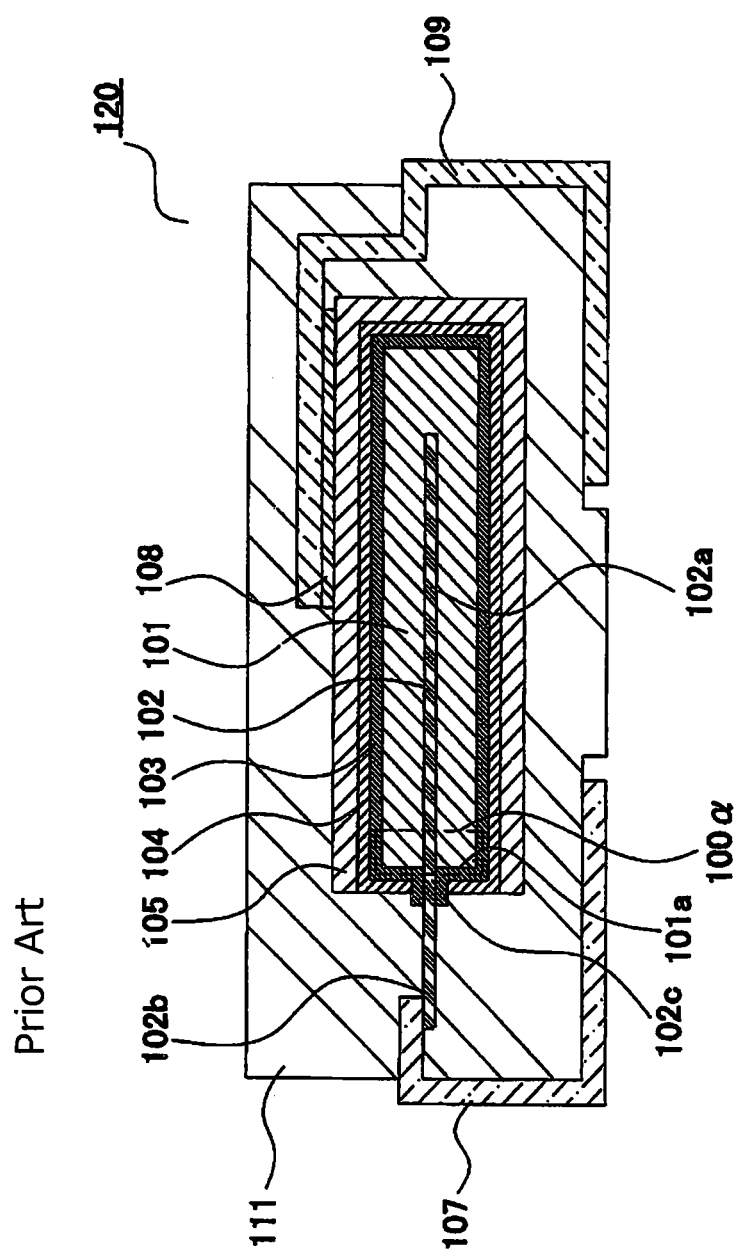
FIG. 10 is a schematic cross-sectional view for illustrating a conventional solid electrolytic capacitor.

FIG. 9 is a perspective view showing an arrangement of an anode 63 and cathodes 64 and 64B in a conversion coating apparatus used in this embodiment. In this figure, see-through portions which are some of the ridges of the anode 1 and some of the cathodes 64B are shown in dash lines. The anode 63 is connected to the other end portion 2b of the anode lead 2. The cathodes 64 are disposed above the anode 1 in the vicinity of the root 2c of the anode lead 2. The cathodes 64B have a shape in which thin wires are formed into a lattice, and the sides of the lattice are disposed on the respective ridges of the anode 1. When the cathodes 64 and 64B are arranged on and above the anode 1 in this manner, followed by anodization, the thicknesses of the dielectric layer 3 in the first region A, the second regions B, the sixth region F, and the seventh regions Gx, Gy, and Gz can be made locally thicker than those of the dielectric layer 3 in the other regions.

Although in this embodiment the dielectric layer is increased in thickness in all of the seventh regions Gx, Gy, and Gz, the dielectric layer may be increased in thickness only in some of the seventh regions. For example, if the dielectric layer is increased in thickness only in the seventh regions Gx located at the one end surface 1a having no cathode extraction layer thereon, the leakage current can be further reduced.

(Fourth Embodiment)

A description will be given below of a fourth embodiment, in which FIG. 1 is referred to in common with the first embodiment.

The solid electrolytic capacitor 20 of this embodiment has, as shown in FIG. 1, a capacitor element including: an anode 1 in which an anode lead 2 is embedded; a dielectric layer 3 formed on the anode 1; an electrolyte layer 4 formed on the dielectric layer 3; and a cathode extraction layer 5 formed on the electrolyte layer 4. An anode terminal 7 is connected to the other end portion 2b of the anode lead 2, and a cathode terminal 9 is bonded to the cathode extraction layer 5 by a conductive adhesive 8. Furthermore, a resin outer package 11 is formed to surround the capacitor element and expose respective portions of the anode terminal 7 and the cathode terminal 9 to the outside. Note that this figure schematically shows only a portion of the dielectric layer 3 formed on the outside surface of the anode 1 formed of a porous sintered body. Regions of the anode 1 and the thickness distribution of the dielectric layer 3 in this embodiment will be described later.

Hereinafter, a description will be given of a specific structure of the solid electrolytic capacitor 20 of this embodiment.

In this embodiment, the material used for the anode 1 is a porous sintered body made of a valve metal or a valve metal-based alloy. The anode 1 is produced by forming metal particles made of one of a large number of kinds of valve metals or one of a large number of kinds of valve metal-based alloys into a green anode body and sintering the green anode body. Examples of the valve metal include those exemplified in the first embodiment. Examples of the valve metal-based alloy include those exemplified in the first embodiment.

Examples of the material for the anode lead 2 that can be used include the materials exemplified in the first embodiment.

As shown in FIG. 1, the anode 1 has one end surface 1a, the other end surface 1b, and side surfaces 1c, all of which form the outside surface of the porous sintered body. One end portion 2a of the anode lead 2 is embedded into the one end surface 1a of the anode 1, and the other end portion 2b of the anode lead 2 extends out of the one end surface 1a of the anode 1. The other end surface 1b is a surface of the anode 1 opposite to the one end surface 1a. A root 2c of the anode lead 2 refers to a portion of the anode lead 2 beyond which the anode lead 2 extends out of the anode 1.

Figure 11A:
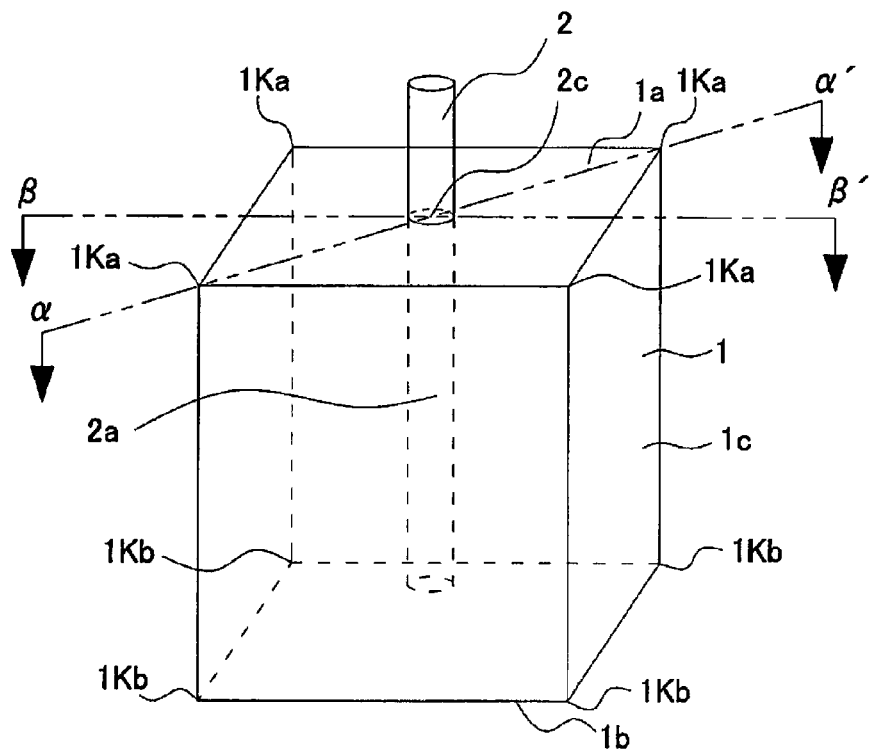

FIG. 11A is a perspective view which shows the shape of the anode 1 having the anode lead 2 embedded therein and in which portions (dashed portions) are shown through. As shown in FIG. 11A, the anode 1 has the outer shape of a rectangular box composed of one end surface 1a, the other end surface 1b, and four side surfaces 1c located between the one end surface 1a and the other end surface 1b. Furthermore, the anode 1 has eight corners 1Ka, 1Kb, which are apexes of the rectangular box. The corners 1Ka are those of the one end surface 1a, while the corners 1Kb are those of the other end surface 1b.

Figure 11B:
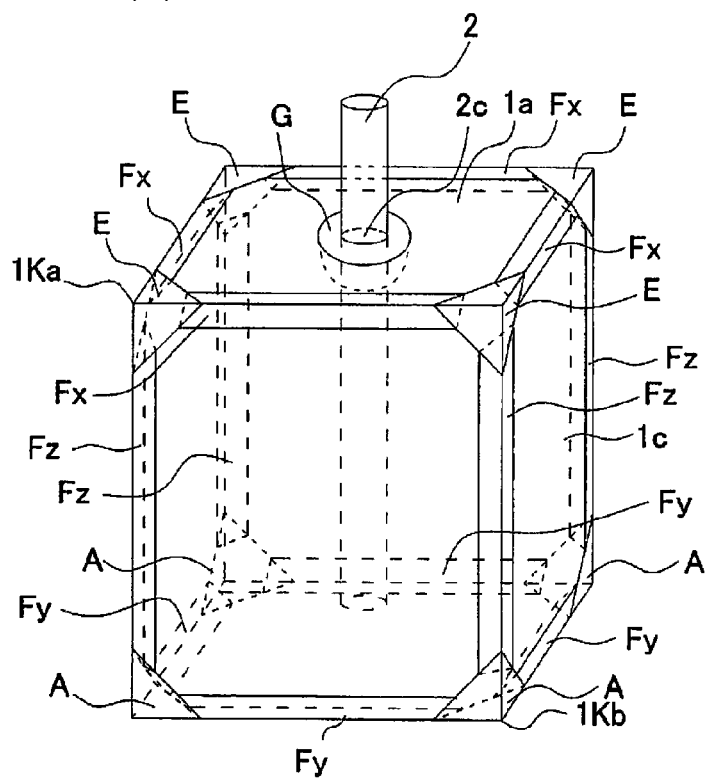
Figure 12A:
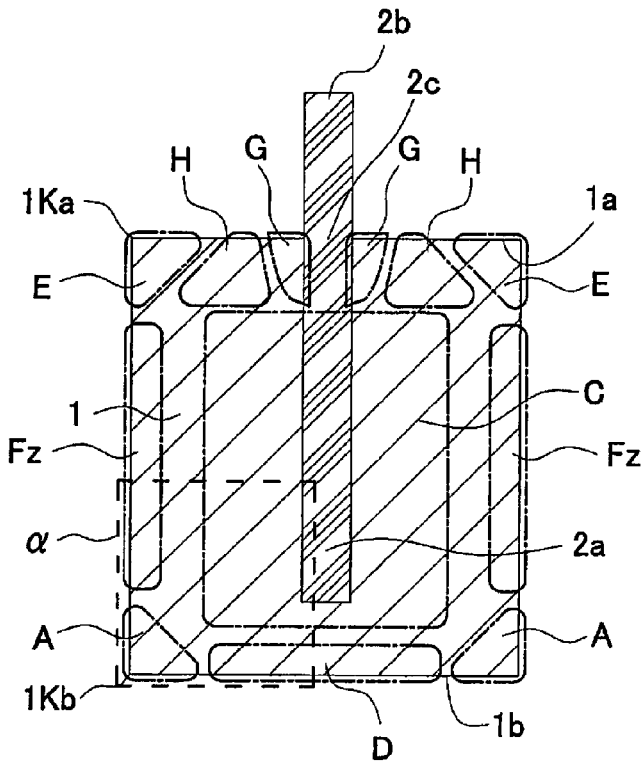
FIG. 12A is a cross-sectional view in which the anode 1 is cut, on the line a-a' (dash-double-dot line) shown in FIG. 11A and passing through a pair of diagonal corners 1Ka, 1Ka of one end surface 1a of the anode 1 and the anode lead 2, along the direction of the arrows which is the longitudinal direction of the anode lead 2.

FIG. 11B is a perspective view for illustrating regions of the anode 1, in which portions (dashed portions) are shown through. FIG. 12A is a cross-sectional view in which the anode 1 is cut, on the line a-a' (dash-double-dot line) shown in FIG. 11A and passing through a pair of diagonal corners 1Ka, 1Ka of one end surface 1a of the anode 1 and the anode lead 2, along the direction of the arrows which is the longitudinal direction of the anode lead 2.

Figure 12B:
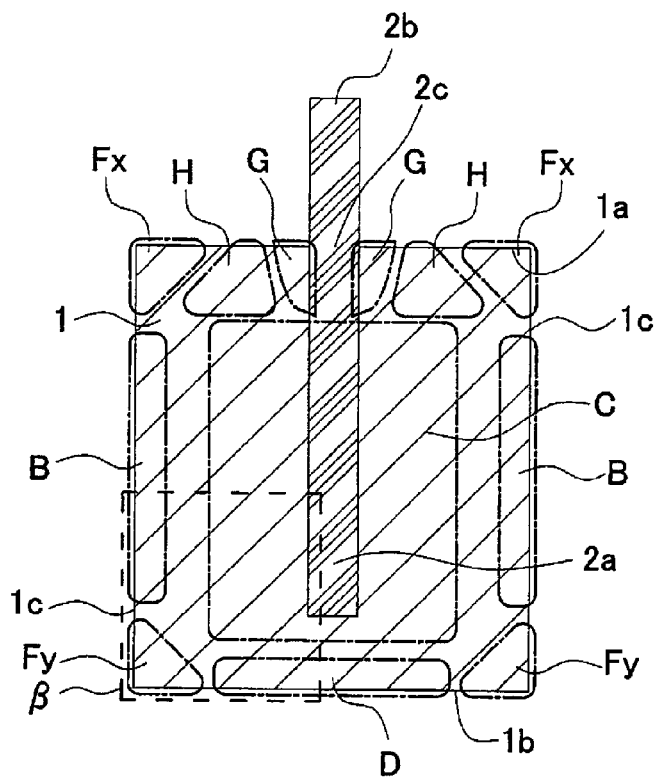
FIG. 12B is a cross-sectional view in which the anode 1 is cut, on the line β-β, (dash-double-dot line) shown in FIG. 11A and passing through the midpoints of opposed two ridge lines each connecting adjacent two corners 1Ka, 1Ka of the one end surface 1a of the anode 1 and the anode lead 2, along the direction of the arrows which is the longitudinal direction of the anode lead 2.

FIG. 12B is a cross-sectional view in which the anode 1 is cut, on the line Hp (dash-double-dot line) shown in FIG. 11A and passing through the midpoints of opposed two ridge lines each connecting adjacent two corners 1Ka, 1Ka of the one end surface 1a of the anode 1 and the anode lead 2, along the direction of the arrows which is the longitudinal direction of the anode lead 2. The anode 1 includes eleventh regions A, twelfth regions B, a thirteenth region C, a fourteenth region D, fifteenth regions E, sixteenth regions F, a seventeenth region G, and an eighteenth region H. The regions A to H enclosed by the dash-single-dot lines shows the eleventh to eighteenth regions, respectively. Note that FIG. 11B shows only the eleventh regions A, the fifteenth regions E, the sixteenth regions Fx, Fy, and Fz, and the seventeenth region G. The eleventh regions A are regions at the corners 1Kb of the other end surface 1b. The twelfth regions B are regions in central portions of the side surfaces 1c. The thirteenth region C is a region located in the interior of the anode 1 and surrounding one end portion 2a of the anode lead 2 embedded in the anode 1.

The fourteenth region D is a region in a central portion of the other end surface 1b. The fifteenth regions E are regions at the corners 1Ka of the one end surface 1a. The sixteenth regions Fx are four ridges connecting between the adjacent corners 1Ka of the anode 1. The sixteenth regions Fy are four ridges connecting between the adjacent corners 1Kb of the anode 1. The sixteenth regions Fz are four ridges connecting between the adjacent corners 1Ka and 1Kb of the anode 1. The seventeenth region G is a region adjacent to the root 2c at which the anode lead 2 is embedded into the anode 1. The eighteenth region H is a region at the one end surface 1a between the seventeenth region G and the fifteenth regions E.

Figure 13A:
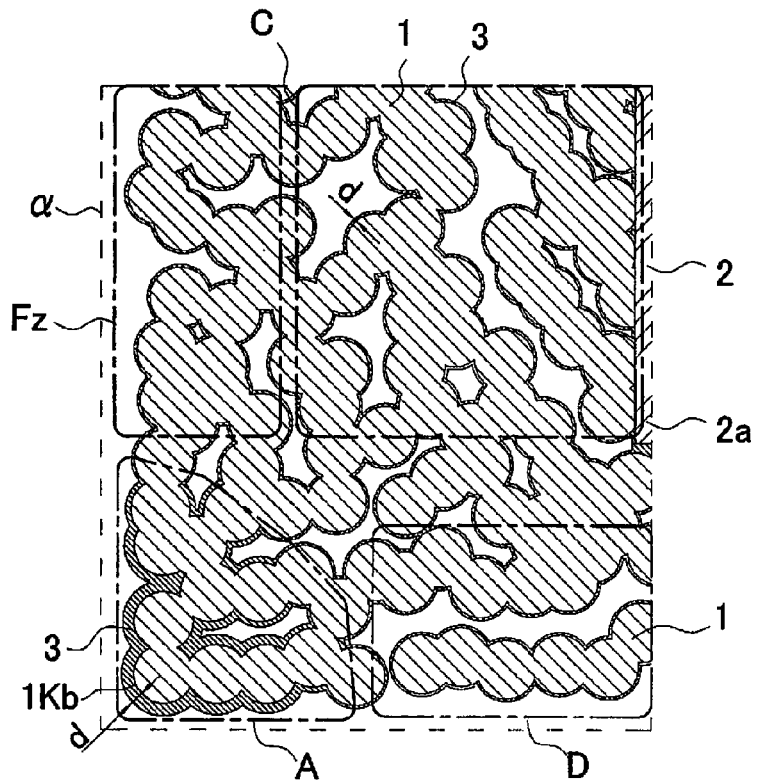
FIG. 13A is a schematic cross-sectional view showing a dielectric layer 3 formed on the surface of the anode 1 within an area of the anode 1 enclosed by the dash line a in FIG. 12A.
Figure 13B:
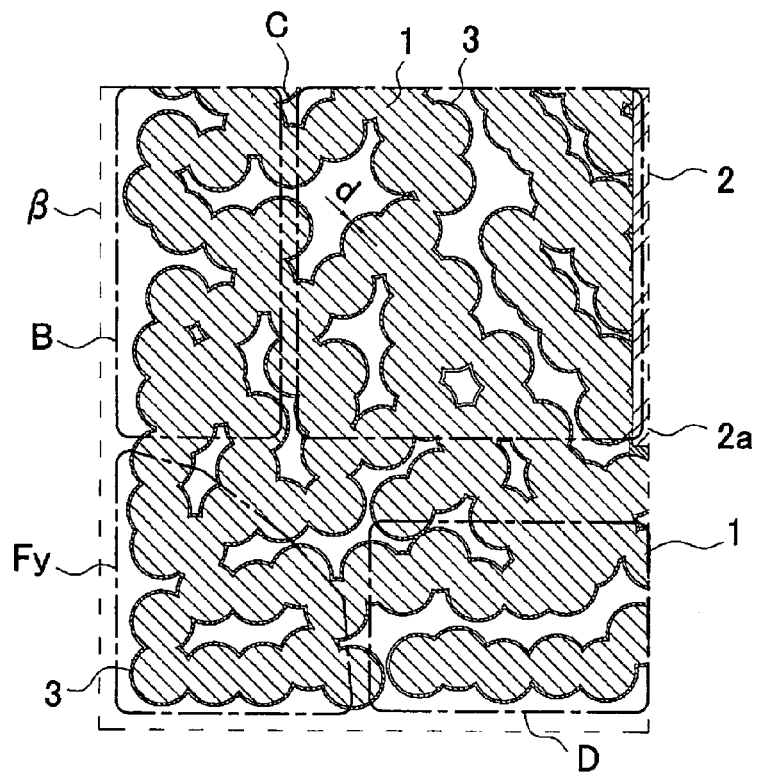
FIG. 13B is a schematic cross-sectional view showing a dielectric layer 3 formed on the surface of the anode 1 within an area of the anode 1 enclosed by the dash line β in FIG. 12B.

FIG. 13A is a schematic cross-sectional view showing the dielectric layer 3 formed on the surface of the anode 1 within an area of the anode 1 enclosed by the dash line α in FIG. 12A. FIG. 13B is a schematic cross-sectional view showing the dielectric layer 3 formed on the surface of the anode 1 within an area of the anode 1 enclosed by the dash line β in FIG. 12B. Since, as shown in FIGS. 13A and 13B, the dielectric layer 3 is formed on the surface of the anode 1 made of a porous sintered body, it is formed not only on the outside surface of the porous sintered body but also the wall surfaces of pores inside the porous sintered body.

In this embodiment the thickness of the dielectric layer 3 in the eleventh regions A is greater than those of the dielectric layer 3 in the regions other than the eleventh regions A. Specifically, the thickness of the dielectric layer 3 on the surface of the anode 1 in the eleventh regions A is greater than the thicknesses of the dielectric layer 3 on the surface of the anode 1 in the twelfth regions B and the thirteenth region C. Furthermore, the thickness of the dielectric layer 3 on the surface of the anode 1 in the eleventh regions A is greater than the thicknesses of the dielectric layer 3 on the surface of the anode 1 in the fourteenth region D, the fifteenth regions E, the sixteenth regions F, the seventeenth region G, and the eighteenth region H.

In this embodiment, as shown in FIG. 13A, the dielectric layer 3 is formed in the eleventh regions A to gradually reduce its thickness with distance from the corner 1Kb of the anode 1. However, the portions of the dielectric layer 3 in the eleventh regions A may be formed uniformly and thick.

The thickness of the dielectric layer 3 can be measured with a cross-sectional scanning electron microscope (cross-sectional SEM). As shown in FIGS. 13A and 13B, the thickness of the dielectric layer 3 can be determined by measuring the distance d from the surface of the anode 1 to the surface of the dielectric layer 3. The use of a cross-sectional SEM image in this manner enables the measurement of the thickness of the dielectric layer 3 on the outside surface of the porous sintered body and the thickness of the dielectric layer 3 on the wall surfaces of pores inside the porous sintered body. In this embodiment, the thicknesses of the dielectric layer 3 at arbitrary five points in each of the eleventh to thirteenth regions, for example, within the cross section obtained by cutting the solid electrolytic capacitor 20 in the direction shown in FIG. 11A, are measured and the measured values for each region are averaged to determine the thickness of the dielectric layer in each of the eleventh to thirteenth regions. The thickness of the dielectric layer 3 in the fourteenth region D is also determined in the same manner.

The electrolyte layer 4, the cathode extraction layer 5, the cathode terminal 9, the anode terminal 7, and the resin outer package 11 can be, for example, the same as those in the first embodiment.

(Functions and Effects)

In the solid electrolytic capacitor of this embodiment, since the thickness of the dielectric layer 3 in the eleventh regions A likely to collect stress from the resin outer package 11 is greater than the thicknesses of the dielectric layer 3 in the thirteenth region C located inside the anode 1 and less susceptible to the stress and the twelfth regions B located in the central portions of the side surfaces 1C of the anode 1 and likewise less susceptible to the stress, the effects of the stress in the eleventh regions A can be reduced to reduce the leakage current.

In this embodiment, only the thickness of the dielectric layer 3 in the eleventh regions A is greater than those of the dielectric layer 3 in the regions other than the eleventh regions A. Therefore, only the thickness of the dielectric layer 3 in the eleventh regions A susceptible to stress from the resin outer package 11 is locally greater than those of the dielectric layer 3 in the other regions, so that the leakage current can be reduced and the decrease in capacitance can be reduced.

Furthermore, in this embodiment, since the dielectric layer 3 is formed in the eleventh regions A to gradually reduce its thickness with distance from the corners 1Kb, the continuous thickness change of the dielectric layer 3 in these regions enables stress applied to the dielectric layer 3 to be dispersed, resulting in further reduced leakage current.

Although in this embodiment the thickness of the dielectric layer 3 is increased at all of the four corners 1Kb of the other end surface 1b, the leakage current can be reduced simply by increasing the thickness of the dielectric layer 3 at least at one corner 1Kb.

Although in this embodiment the anode 1 used has the outer shape of a rectangular box, the shape of the anode 1 is not limited to the rectangular box and the anode 1 need only have such a shape that the other end surface 1b has a corner. Also in such a case, the dielectric layer 3 needs to be formed locally thick in a region of the anode 1 located at the corner 1Kb of the other end surface 1b.

(Manufacturing Method of Tantalum Solid Electrolytic Capacitor of Fourth Embodiment)

A description will be given below of an example of a method for manufacturing a tantalum solid electrolytic capacitor of this embodiment. Note that Step 1: Formation of Anode Electrode, Step 2: First Anodization Step, Step 4: Formation of Electrolyte Layer, Step 5: Formation of Cathode Extraction Layer, and Step 7: Molding Step can be performed substantially in the same manner as those in the first embodiment. Therefore, the description of the first embodiment is incorporated here by reference.

<Step 3: Second Anodization Step (Local Conversion Treatment)>

A description will be given below of a second anodization step for locally subjecting to conversion treatment the portions of the dielectric layer 3 in eleventh regions A which are portions of the dielectric layer 3 uniformly formed in the first anodization step.

Figure 14A:
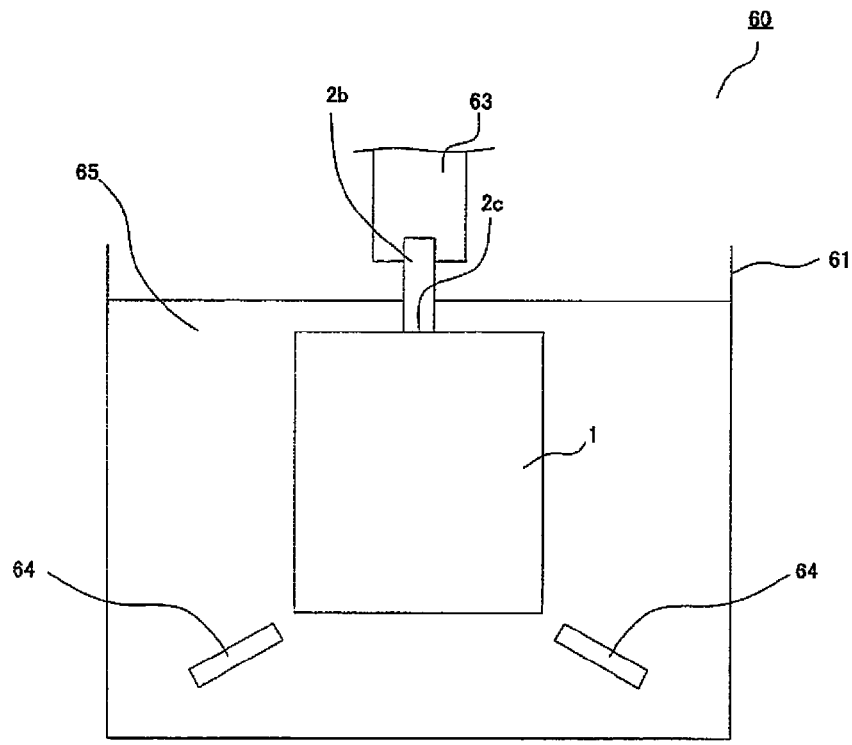
FIG. 14A is a schematic view of a conversion coating apparatus 60.
Figure 14B:
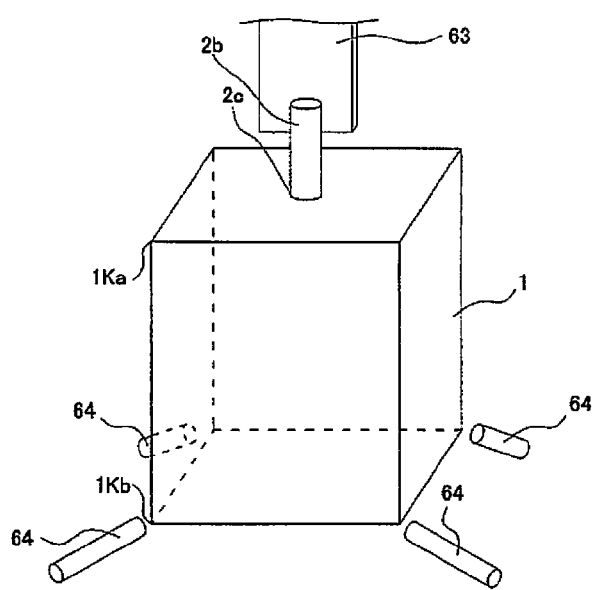
FIG. 14B is a schematic perspective view showing an arrangement of an anode 63 and cathodes 64 relative to the anode 1 and the anode lead 2.

FIG. 14 is views for illustrating the second anodization step. As shown in FIG. 14A, a conversion coating apparatus 60 includes a treatment cell 61, an anode 63, cathodes 64 (some not shown in this figure), and an electrolytic aqueous solution 65. FIG. 14B is a schematic perspective view showing an arrangement of the anode 63 and the cathodes 64 relative to the anode 1 and the anode lead 2. In this figure, see-through portions which are some of the ridges of the anode 1 and some of the cathodes 64 are shown in dash lines. The anode 63 is connected to the other end portion 2b of the anode lead 2. The cathodes 64 have the shape of a thin wire and are arranged close to the respective corners 1Kb of the other end surface 1b of the anode 1. The anode 63 and the cathodes 64 are connected through their respective wires (not shown) to a power source.

The local conversion treatment involves collecting the current to desired points. Therefore, it is necessary to control the concentration (electrical conductivity) of the electrolytic aqueous solution and appropriately arrange the cathodes 64. Specifically, although in the first anodization step a phosphoric acid aqueous solution (electrolytic aqueous solution 55) having a concentration of 0.01% to 0.1% by weight is used, a phosphoric acid aqueous solution (electrolytic aqueous solution 65) having a lower concentration than that in the first anodization step is used in the second anodization step for performing local conversion treatment. Since anodization is performed in this manner so that the concentration of the electrolytic aqueous solution 65 is low and the cathodes 64 are arranged at predetermined points near the anode 1, the thickness of the dielectric layer 3 on the surface of the anode 1 in the eleventh regions A can be locally increased as compared with the thicknesses of the dielectric layer 3 on the surface of the anode 1 in the other regions, i.e., the twelfth to eighteenth regions B to H.

The eleventh regions A are appropriately formed depending upon the shape of the anode 1. For example, the portions of the dielectric layer 3 in the eleventh regions A are preferably formed to have an increase thickness over the range of 0.1 to 1.0 mm from the respective corners 1Kb.

Even if the cathodes 64 are locally arranged, the thickness distribution of the dielectric layer 3 is broadened when the concentration of the electrolytic aqueous solution 65 is high. Therefore, the phosphoric acid aqueous solution preferably has a concentration of about 0.0001% to about 0.005% by weight.

If the distance from the tip of the cathode 64 having the shape of a thin wire to the surface of the anode 1 is too large, the thickness distribution of the dielectric layer 3 may be broadened. On the other hand, if the distance is too small, the dielectric layer 3 may form a short-circuit with the anode 1. Therefore, the distance from the tip of the cathode 64 to the surface of the anode 1 is preferably about 0.1 to about 3 mm.

If the time of local conversion treatment is too short, the dielectric layer 3 cannot have a sufficient thickness. On the other hand, if the time of local conversion treatment is too long, the thickness distribution of the dielectric layer 3 will be broadened. Therefore, the local conversion treatment is preferably performed for a period of from 0.5 to 10 minutes. If the voltage for local conversion treatment is too low, the dielectric layer 3 cannot have a sufficient thickness. On the other hand, if the voltage is too high, the thickness distribution of the dielectric layer will be broadened. Therefore, the local conversion treatment is preferably performed at a voltage of from 50 to 200V. In addition, the voltage for local conversion treatment is preferably twice to ten times the anodization voltage in the first anodization step.

The electrolytic aqueous solution 65 that can be used for local conversion treatment is not limited to the phosphoric acid aqueous solution and other examples thereof include nitric acid, acetic acid, and sulfuric acid. In this embodiment, since the electrolytic aqueous solutions containing the same electrolyte are used in both the first and second anodization steps, the washing step after the first anodization step can be simplified.

Although the cathodes 64 shown in FIG. 14B have the shape of a thin wire, a needle-like electrode having a pointed tip end may be used instead. As the tip of the cathode 64 is sharpened, a better localized thickness distribution of the dielectric layer 3 can be achieved.

<Step 6: Connection of Anode Terminal and Cathode Terminal>

One end portion 7a of an anode terminal 7 is electrically and mechanically connected to the other end portion 2b of the anode lead 2 by welding or otherwise. Furthermore, one end portion 9a of a cathode terminal 9 is electrically and mechanically connected to a surface of the cathode extraction layer 5 by a conductive adhesive 8.

Note that in this embodiment the anode terminal 7 and the anode lead 2 are connected to each other prior to the formation of the dielectric layer 3 and the anode terminal 7 also functions as the anodes 53 and 63 in the above Steps 2 and 3, respectively. Furthermore, the electrolyte layer 4 and the cathode extraction layer 5 are formed with the anode terminal 7 and the anode lead 2 connected to each other.

In the manufacturing method of this embodiment, since the portions of the dielectric layer 3 in the eleventh regions A susceptible to stress in molding step can be formed locally thicker than the portions of the dielectric layer 3 in the other regions, the leakage current can be reduced.

In forming a plurality of solid electrolytic capacitors, a plurality of anode terminals 7 are formed in a strip-shaped lead frame, the same number of anodes 1 are arranged one for each of the plurality of anode terminals 7, and the same number of anode leads 2 are connected one to each of the anode terminals 7. Likewise, a plurality of cathode terminals 9 are formed in a strip-shaped lead frame, the same number of cathode extraction layers 5 of capacitor elements are connected one to each of the cathode terminals 9. With the plurality of capacitor elements fixed to the lead frames in this manner, the same number of resin outer packages 11 are formed in Step 7. Next, unnecessary portions of the lead frames are cut away and the anode terminals 7 and the cathode terminals 9 are bent in the same manner as in Step 7 to form the plurality of solid electrolytic capacitors.

In preparing a plurality of anodes 1 in order to form a plurality of solid electrolytic capacitors, the plurality of anodes 1 may come into contact with each other and, particularly, the corners 1Kb of the other end surface 1b of the anode 1 are highly likely to come into contact with other anodes 1 as compared with the corners 1Ka of the one end surface 1a of the anode 1 out of which the anode lead 2 extends. Furthermore, in this embodiment, since the anode terminal 7 and the anode lead 2 are connected to each other prior to the formation of the dielectric layer 3, the corners 1Kb are highly likely to come into contact with jigs and the like used in later steps as compared with the corners 1Ka. Therefore, the portions of the dielectric layer 3 on the corners 1Kb are more likely to cause defects and thereby increase the leakage current than the portions of the dielectric layer 3 on the corners 1Ka. To cope with this, in this embodiment, the dielectric layer 3 is formed thicker on the corners 1Kb of the other end surface 1b of the anode 1 than on the corners 1Ka of the one end surface 1a of the anode 1. Thus, the leakage current can be further reduced.

Fifth Embodiment

Next, a description will be given of a solid electrolytic capacitor of a fifth embodiment. Further explanation of the same elements as in the fourth embodiment described above will be omitted.

In this embodiment, not only in the eleventh regions A in the fourth embodiment but also in the fifteenth regions E described above, the dielectric layer 3 is increased in thickness.

In this embodiment the thicknesses of the dielectric layer 3 in the eleventh regions A and the fifteenth regions E are greater than those of the dielectric layer 3 in the regions other than the eleventh regions A and the fifteenth regions E. Specifically, the thicknesses of the dielectric layer 3 in the eleventh regions A and the fifteenth regions E are greater than the thicknesses of the dielectric layer 3 in the twelfth regions B and the thirteenth region C. Furthermore, the thicknesses of the dielectric layer 3 in the eleventh regions A and the fifteenth regions E are greater than the thicknesses of the dielectric layer 3 on the surface of the anode 1 in the fourteenth region D, the sixteenth regions F, the seventeenth region G, and the eighteenth region H.

In this embodiment, since the portions of the dielectric layer 3 in the eleventh and fifteenth regions A and E at the corners 1Ka and 1Kb of the anode 1 susceptible to stress from the resin outer package 11 are formed thicker than the portions of the dielectric layer 3 in the twelfth and thirteenth regions B and C less susceptible to the stress, the leakage current can be further reduced.

Furthermore, in this embodiment, since the portions of the dielectric layer 3 in the eleventh and fifteenth regions A and E at the corners 1Ka and 1Kb of the anode 1 susceptible to stress from the resin outer package 11 are formed locally thicker than the portions of the dielectric layer 3 in the regions other than the eleventh and fifteenth regions A and E, not only the leakage current can be reduced but also the decrease in capacitance can be reduced.

(Manufacturing Method of Tantalum Solid Electrolytic Capacitor of Fifth Embodiment)

A description will be given below of a method for manufacturing a tantalum solid electrolytic capacitor of this embodiment.

The following description will be given of Step 3 different from that in the fourth embodiment. Further explanation of the same elements as in the fourth embodiment described above will be omitted.

<Step 3: Second Anodization Step (Local Conversion Treatment)>

Figure 19:
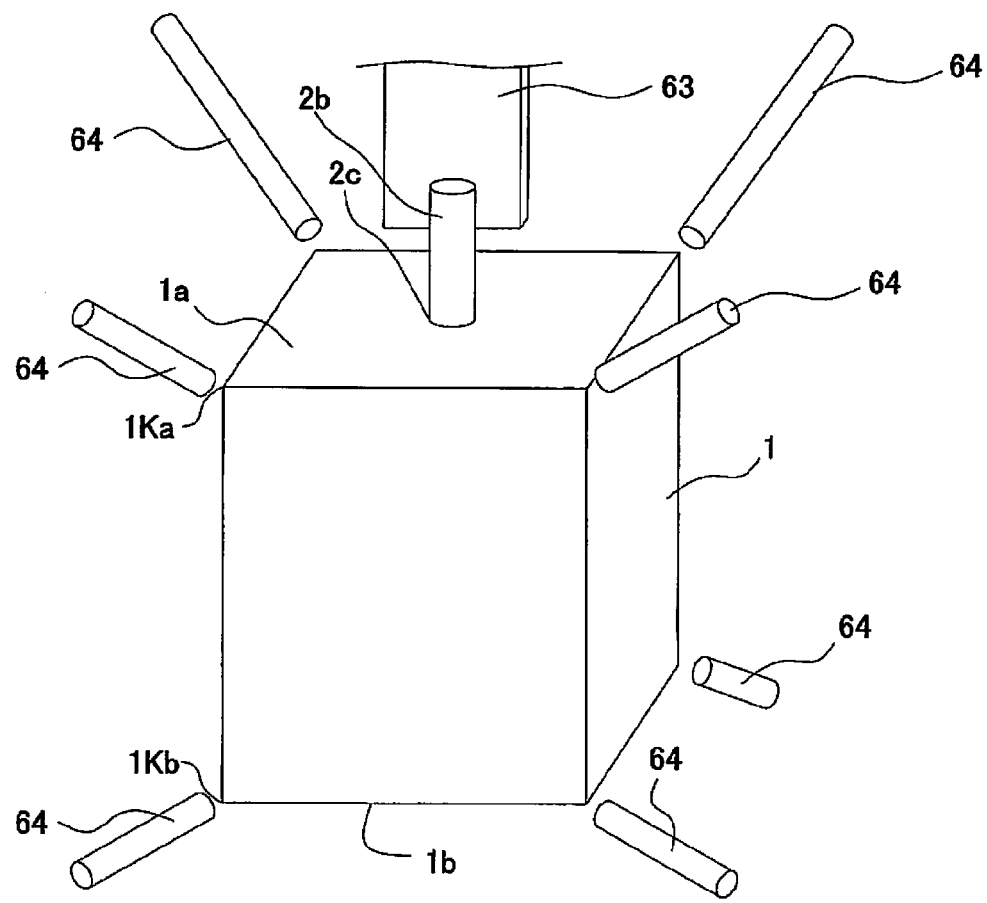
FIG. 19 is a view for illustrating a second anodization step in a fifth embodiment.

FIG. 19 is a schematic perspective view showing an arrangement of an anode 63 and cathodes 64 in a conversion coating apparatus. The anode 63 is connected to the other end portion 2b of the anode lead 2. The cathodes 64 are arranged not only close to the regions of the anode 1 located at the corners 1Kb of the other end surface 1b but also close to the regions thereof located at the four corners 1Ka of the one end surface 1a, one cathode for each of the four corners 1Ka.

Since the cathodes 64 are arranged as shown in this figure and local conversion treatment is performed, the thicknesses of the dielectric layer 3 in the fifteenth regions E, which are the regions at the corners 1Ka of the one end surface 1a of the anode 1, can be locally increased like that in the eleventh regions A.

(Sixth Embodiment)

Next, a description will be given of a solid electrolytic capacitor of a sixth embodiment. Further explanation of the same elements as in the fourth and fifth embodiments described above will be omitted. In this embodiment, not only in the eleventh regions A and the fifteenth regions E but also in the sixteenth regions Fx, Fy, and Fz which are the ridges of the anode formed of a rectangular box, the dielectric layer 3 is increased in thickness.

In this embodiment the thicknesses of the dielectric layer 3 in the eleventh regions A, the fifteenth regions E, and the sixteenth regions Fx, Fy, and Fz are greater than those of the dielectric layer 3 in the regions other than the eleventh regions A, the fifteenth regions E, and the sixteenth regions Fx, Fy, and Fz. Specifically, the thicknesses of the dielectric layer 3 in the eleventh regions A, the fifteenth regions E, and the sixteenth regions Fx, Fy, and Fz are greater than the thicknesses of the dielectric layer 3 in the twelfth regions B and the thirteenth region C. Furthermore, the thicknesses of the dielectric layer 3 in the eleventh regions A, the fifteenth regions E, and the sixteenth regions Fx, Fy, and Fz are greater than the thicknesses of the dielectric layer 3 on the surface of the anode 1 in the fourteenth region D, the seventeenth region G, and the eighteenth region H.

Since in the solid electrolytic capacitor of this embodiment the thickness of the dielectric layer is increased not only in the eleventh and fifteenth regions A and E but also in the sixteenth regions Fx, Fy, and Fz, which are the regions around the edges of the anode 1 likewise susceptible to stress from the resin outer package 11, the leakage current can be further reduced.

(Manufacturing Method of Tantalum Solid Electrolytic Capacitor of Sixth Embodiment)

A description will be given below of a method for manufacturing a tantalum solid electrolytic capacitor of this embodiment.

The following description will be given of Step 3 different from that in the fourth embodiment. Further explanation of the same elements as in the fourth embodiment described above will be omitted.

<Step 3: Second Anodization Step (Local Conversion Treatment)>

Figure 15:
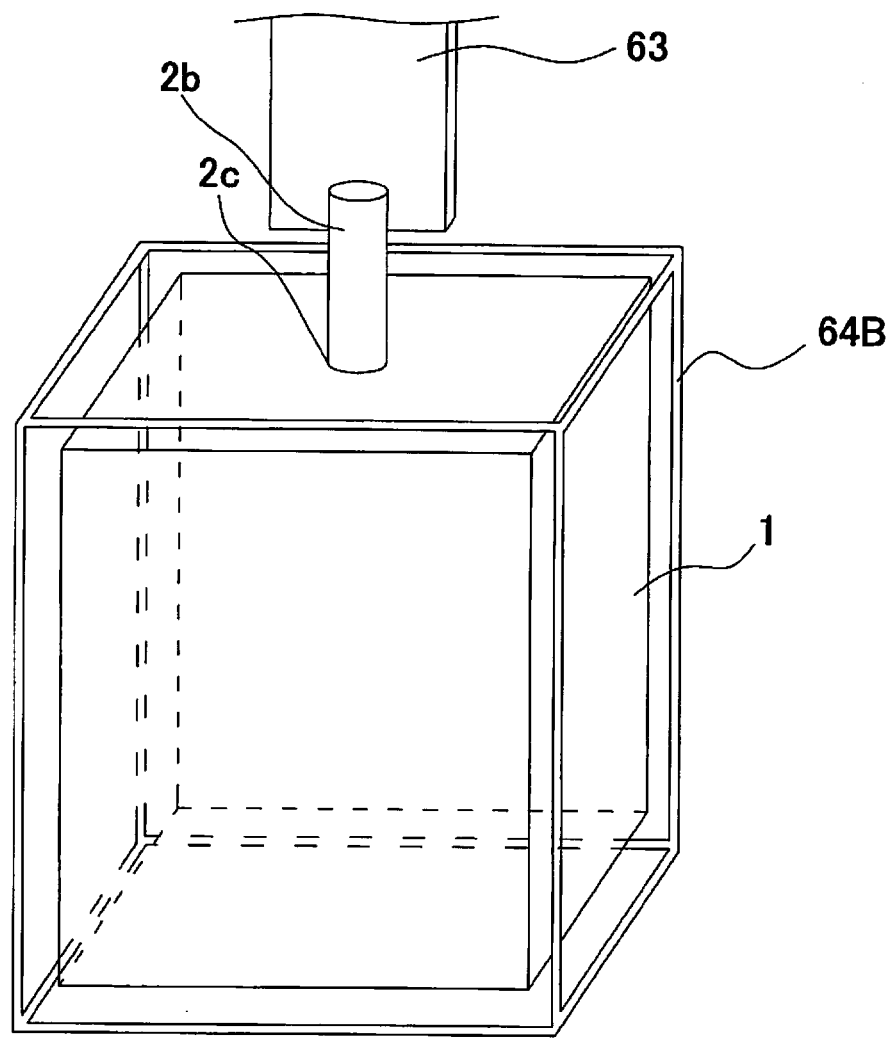
FIG. 15 is a view for illustrating a second anodization step in a sixth embodiment.

FIG. 15 is a perspective view showing an arrangement of an anode 63 and cathodes 64B in a conversion coating apparatus used in this embodiment. In this figure, see-through portions which are some of the ridges of the anode 1 and some of the cathodes 64B are shown in dash lines. The anode 63 is connected to the other end portion 2b of the anode lead 2. The cathodes 64B have a shape in which thin wires are formed into a lattice, and the sides of the lattice are disposed on the respective ridges of the anode 1. When the cathodes 64B are arranged on the anode 1 in this manner, followed by anodization, the thicknesses of the dielectric layer 3 in the eleventh regions A, the fifteenth regions E, and the sixteenth regions Fx, Fy, and Fz can be made locally thicker than those of the dielectric layer 3 in the other regions.

Although in this embodiment the dielectric layer is increased in thickness in all of the sixteenth regions Fx, Fy, and Fz, the dielectric layer may be increased in thickness only in some of the sixteenth regions. For example if the dielectric layer 3 is increased in thickness only in the sixteenth regions Fx located at the one end surface 1a having no cathode extraction layer thereon, the leakage current can be further reduced.

(Modification 1)

Next, a description will be given of a modification of the solid electrolytic capacitor of the fourth embodiment. Further explanation of the same elements as described above will be omitted.

Figure 16:
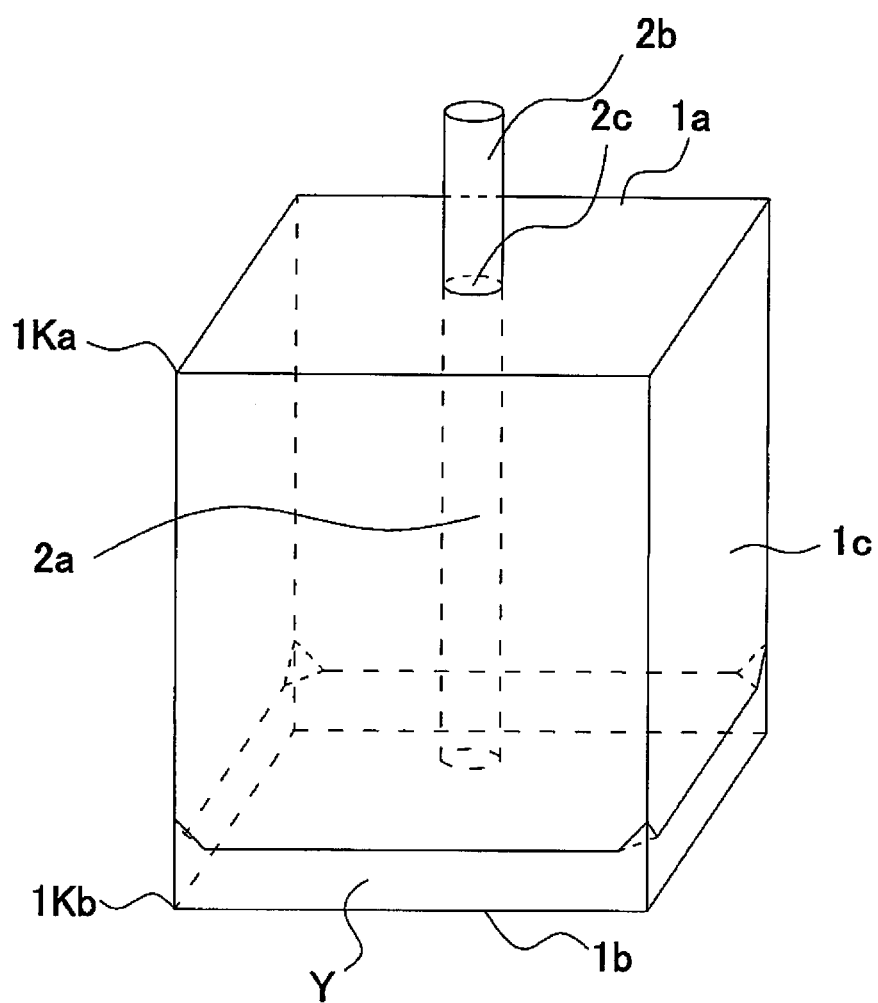
FIG. 16 is a view for illustrating regions of an anode in a first modification.

In this modification, by increasing the thickness of the dielectric layer 1 over the entire region Y of the other end surface 1b of the anode 1, the dielectric layer 3 is increased in thickness not only in the eleventh regions A in the fourth embodiment but also in the fourteenth region D and the sixteenth regions Fy. The others of the eleventh to eighteenth regions A to H are as shown in FIGS. 11 and 12. FIG. 16 is a perspective view for illustrating regions of the anode 1, in which portions (dashed portions) are shown through. In this figure, Y represents the region of the other end surface 1b of the anode 1 composed of the eleventh regions A, the fourteenth region D, and the sixteenth regions Fy.

In this modification, the thickness of the dielectric layer in the region Y of the other end surface 1b of the anode 1 is greater than the thicknesses of the dielectric layer 3 in the regions of the anode 1 other than the region Y of the other end surface 1b of the anode 1. Specifically, the thicknesses of the dielectric layer in the eleventh regions A, the fourteenth region D, and the sixteenth regions Fy are greater than the thicknesses of the dielectric layer in the twelfth regions B, the thirteenth region C, the fifteenth regions E, the sixteenth regions Fx and Fz, the seventeenth region G, and the eighteenth region H.

In this modification, since the thicknesses of the dielectric layer 3 in the fourteenth region D and the sixteenth regions Fy are also greater than those in the fourth embodiment, the leakage current can be further reduced.

(Modification 2)

Next, a description will be given of a modification of the solid electrolytic capacitor of the fifth embodiment. Further explanation of the same elements as in the fourth and fifth embodiments will be omitted.

Figure 17A:
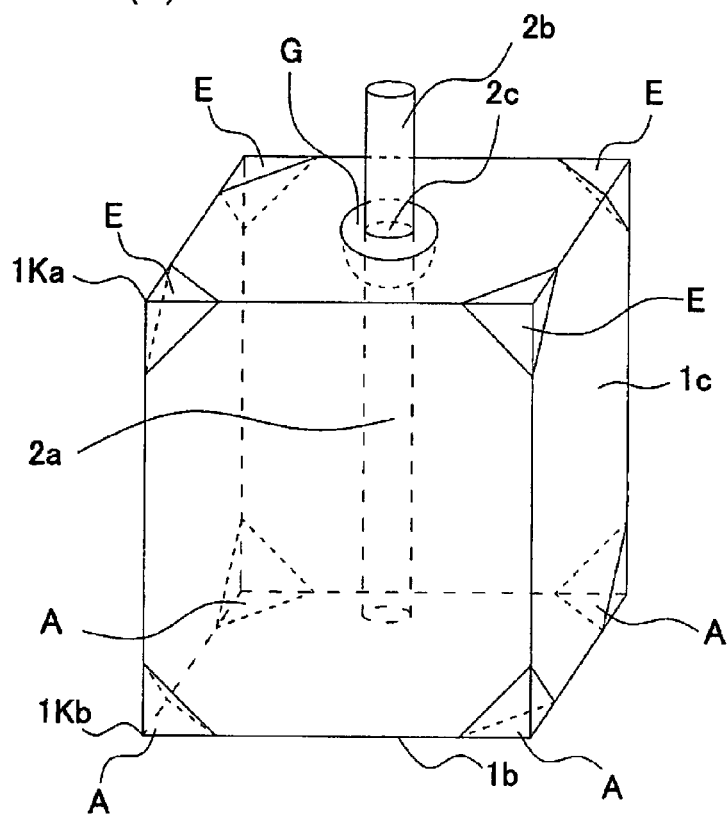
Figure 17B:
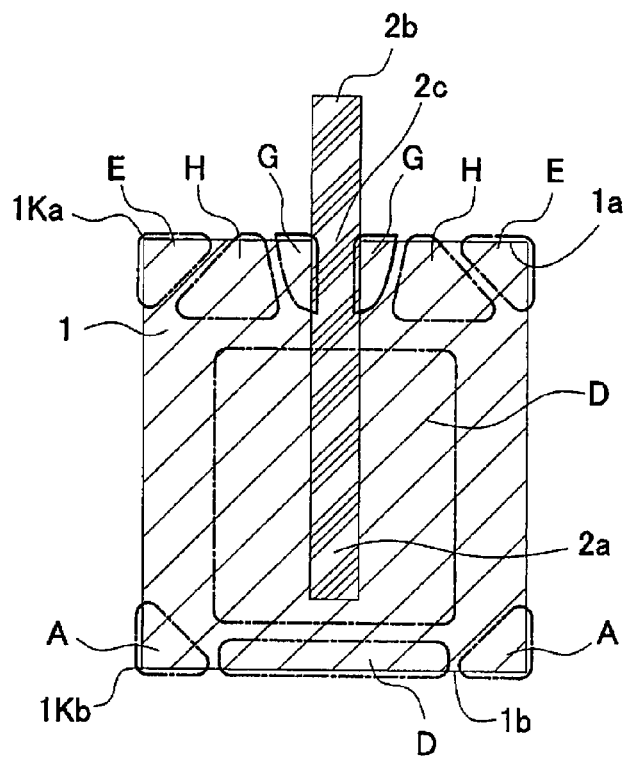
FIG. 17B is a cross-sectional view in which the anode 1 is cut diagonally across corners 1Ka, 1Kb and the anode lead 2.

In this modification, not only in the eleventh regions A and the fifteenth regions E in the fifth embodiment but also in the seventeenth region G, the dielectric layer 3 is increased in thickness. FIG. 17A is a perspective view for illustrating regions of the anode 1, in which portions (dashed portions) are shown through. FIG. 17B is a cross-sectional view in which the anode 1 is cut diagonally across corners 1Ka, 1Kb and the anode lead 2. The seventeenth region G is a region adjacent to the root 2c at which the anode lead 2 is embedded into the anode 1. The eighteenth region H is a region at the one end surface 1a between the seventeenth region G and the fifteenth regions E.

In this modification the thicknesses of the dielectric layer 3 in the eleventh regions A, the fifteenth regions E, and the seventeenth region G are greater than those of the dielectric layer 3 in the regions other than the eleventh regions A, the fifteenth regions E, and the seventeenth region G. Specifically, the thicknesses of the dielectric layer in the eleventh regions A, the fifteenth regions E, and the seventeenth region G are greater than the thicknesses of the dielectric layer in the twelfth regions B, the thirteenth region C, the fourteenth region D, the sixteenth regions Fx, Fy, and Fz, and the eighteenth region H.

The seventeenth region G can be formed by arranging thin wire-shaped cathodes of a conversion coating apparatus close to the root 2c of the anode lead 2. In this modification, the seventeenth region G is formed concentrically with the periphery of the root 2c of the anode lead 2. However, the seventeenth region G may not necessarily be fully concentric with the root 2c and the concentric ring may lack a portion.

In this modification, since the thickness of the dielectric layer 3 in the seventeenth region G susceptible of stress from the anode lead 2 is greater than that in the fifth embodiment, the leakage current can be further reduced.

(Modification 3)

Next, a description will be given of another modification of the solid electrolytic capacitor of the fifth embodiment. Further explanation of the same elements as in the fourth and fifth embodiments will be omitted.

Figure 18:
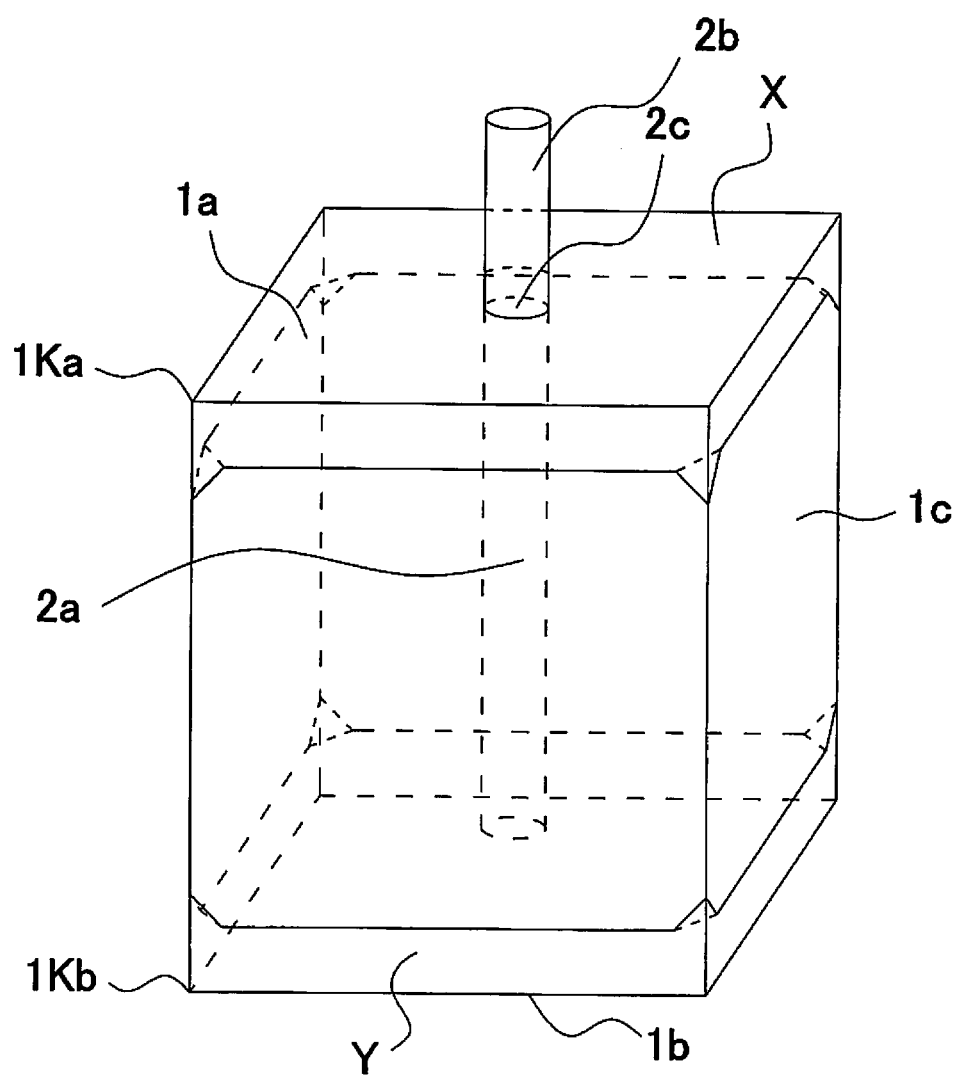
FIG. 18 is a view for illustrating regions of an anode in a third modification.

In this modification, by increasing the thickness of the dielectric layer 1 over the entire region Y of the other end surface 1b of the anode 1 and over the entire region X of the one end surface 1a thereof, the dielectric layer 3 is increased in thickness not only in the eleventh regions A and the fifteenth regions E but also in the fourteenth region D, the sixteenth regions Fx and Fy, the seventeenth region G, and the eighteenth region H. The others of the eleventh to eighteenth regions A to H are as shown in FIGS. 11 and 12. FIG. 18 is a perspective view for illustrating regions of the anode 1, in which portions (dashed portions) are shown through. In this figure, Y represents the region of the other end surface 1b of the anode 1 composed of the eleventh regions A, the fourteenth region D, and the sixteenth regions Fy and X represents the region of the one end surface 1a of the anode 1 composed of the fifteenth region E, the sixteenth regions Fx, the seventeenth region G, and the eighteenth region H.

In this modification, the thicknesses of the dielectric layer 3 in the region Y of the other end surface 1b of the anode 1 and the region X of the one end surface 1a thereof are greater than the thicknesses of the dielectric layer 3 in the twelfth regions B and the thirteenth region C. Furthermore, in this modification, the thicknesses of the dielectric layer 3 in the region X of the one end surface la and the region Y of the other end surface 1b are greater than those of the dielectric layer 3 in the other regions of the anode 1.

In this modification, since the thicknesses of the dielectric layer 3 in the fourteenth region D, the sixteenth regions Fx and Fy, the seventeenth region G, and the eighteenth region H are greater than those in the fifth embodiment, the leakage current can be further reduced.

(Other Embodiments)

Needless to say, the present invention encompasses various embodiments and modifications not described herein.

For example, although the first to third embodiments and Modifications 1 to 3 describe relative thickness relations of the dielectric layer in the regions A to H of the anode 1, at least the thickness of the dielectric layer 3 in the eleventh regions A need only be greater than the thicknesses thereof in the twelfth and thirteenth regions B and C. The dielectric layer 3 may be formed thicker in one or more regions appropriately selected from the fourteenth, fifteenth, sixteenth, seventeenth and eighteenth regions D, E, F, G, and H than in the twelfth and thirteenth regions B and C. Also in such a case, since not only the thickness of the dielectric layer 3 in the eleventh regions A but also the thicknesses thereof in one or more regions selected from the fourteenth, fifteenth, sixteenth, seventeenth and eighteenth regions D, E, F, G, and H are greater than the thicknesses of the dielectric layer 3 in the twelfth and thirteenth regions B and C, the leakage current can be further reduced.

What is claimed is:

1. A solid electrolytic capacitor comprising:
    an anode formed of a porous sintered body having a corner at one end surface and a corner at the other end surface;
    an anode lead having one end portion embedded into the anode and the other end portion extending out of the one end surface of the anode;
    a dielectric layer formed on a surface of the anode; and
    an electrolyte layer formed on the dielectric layer,
    wherein the anode includes a first region adjacent to a root of the anode lead, a second region at the corner of the one end surface, a third region between the first and second regions, and a fourth region in the interior of the anode into which the anode lead is embedded, and
    the thicknesses of the dielectric layer in the first and second regions are greater than the thicknesses of the dielectric layer in the third and fourth regions.

2. The solid electrolytic capacitor according to claim 1, wherein
    the anode further includes a fifth region located in a side surface of the anode and/or a central portion of the other end surface, and
    the thickness of the dielectric layer in the fifth region is smaller than the thicknesses of the dielectric layer in the first and second regions.

3. The solid electrolytic capacitor according to claim 1, wherein
    the anode further includes a sixth region at the corner of the other end surface, and
    the thickness of the dielectric layer in the sixth region is greater than the thicknesses of the dielectric layer in the third and fourth regions.

4. The solid electrolytic capacitor according to claim 1, wherein
    the anode further includes a seventh region which is a ridge connecting the corner at the one end surface and the corner at the other end surface, and
    the thickness of the dielectric layer in the seventh region is greater than the thicknesses of the dielectric layer in the third and fourth regions.

5. A method for manufacturing a solid electrolytic capacitor including: an anode formed of a porous sintered body, the porous sintered body having an anode lead extending out of one end surface thereof and having a corner at the one end surface thereof; and a dielectric layer disposed on a surface of the anode, the method comprising an anodization step of locally anodizing a first region of the anode adjacent to a root of the anode lead and a second region of the anode located at the corner of the one end surface to form the dielectric layer on the surface of the anode.

6. A solid electrolytic capacitor comprising:
    an anode formed of a porous sintered body having a corner at one end surface thereof and a corner at the other end surface thereof located opposite to the one end surface;
    an anode lead having one end portion embedded into the anode and the other end portion extending out of the one end surface of the anode;
    a dielectric layer formed on a surface of the anode; and
    an electrolyte layer formed on the dielectric layer,
    wherein the anode includes an eleventh region at the corner of the other end surface, a twelfth region in a central portion of a side surface of the anode, and a thirteenth region in the interior of the anode into which the anode lead is embedded, and
    the thickness of the dielectric layer in the eleventh region is greater than the thicknesses of the dielectric layer in the twelfth and thirteenth regions.

7. The solid electrolytic capacitor according to claim 6, wherein
    the anode further includes a fifteenth region at the corner of the one end surface, and
    the thickness of the dielectric layer in the fifteenth region is greater than the thicknesses of the dielectric layer in the twelfth and thirteenth regions.

8. The solid electrolytic capacitor according to claim 6, wherein
    the anode further includes a sixteenth region which is a ridge connecting the corner at the one end surface and the corner at the other end surface, and
    the thickness of the dielectric layer in the sixteenth region is greater than the thicknesses of the dielectric layer in the twelfth and thirteenth regions.

9. A method for manufacturing a solid electrolytic capacitor including: an anode formed of a porous sintered body, the porous sintered body having an anode lead extending out of one end surface thereof and having a corner at the one end surface and a corner at the other end surface located opposite to the one end surface; and a dielectric layer disposed on a surface of the anode, the method comprising an anodization step of locally anodizing an eleventh region of the anode located at the corner of the other end surface to form the dielectric layer on the surface of the anode.

* * * * *